US012573913B2

(12) United States Patent
Ito et al.

(10) Patent No.: US 12,573,913 B2
(45) Date of Patent: Mar. 10, 2026

(54) ROTATING ELECTRIC MACHINE SYSTEM, AND COMBINED POWER SYSTEM EQUIPPED THEREWITH

(71) Applicant: HONDA MOTOR CO., LTD., Tokyo (JP)

(72) Inventors: Naoki Ito, Wako (JP); Yuichiro Mitsui, Wako (JP); Tatsuya Choji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 18/447,373

(22) Filed: Aug. 10, 2023

(65) Prior Publication Data

US 2024/0055939 A1 Feb. 15, 2024

(30) Foreign Application Priority Data

Aug. 12, 2022 (JP) ................................. 2022-128748

(51) Int. Cl.
| | |
|---|---|
| *H02K 9/19* | (2006.01) |
| *F02B 63/04* | (2006.01) |
| *H02K 5/04* | (2006.01) |
| *H02K 7/00* | (2006.01) |
| *H02K 7/08* | (2006.01) |

(52) U.S. Cl.
CPC ............. *H02K 7/08* (2013.01); *F02B 63/042* (2013.01); *H02K 5/04* (2013.01); *H02K 7/003* (2013.01)

(58) Field of Classification Search
CPC .. H02K 9/19; H02K 1/20; H02K 1/32; H02K 5/20; H02K 5/1732
See application file for complete search history.

(56) References Cited

U.S. PATENT DOCUMENTS

| | | | |
|---|---|---|---|
| 2013/0038151 A1* | 2/2013 | Ohashi | H02K 7/086 |
| | | | 310/59 |
| 2017/0271958 A1 | 9/2017 | Kitta et al. | |
| 2018/0091011 A1* | 3/2018 | Higashino | H02K 9/00 |
| 2019/0115800 A1 | 4/2019 | Yoshinori et al. | |

(Continued)

FOREIGN PATENT DOCUMENTS

| | | | | |
|---|---|---|---|---|
| CN | 108512363 A | * | 9/2018 | .............. H02K 5/20 |
| EP | 1553682 A2 | | 7/2005 | |

(Continued)

OTHER PUBLICATIONS

CN-108512363-A Machine Translation (Year: 2018).*

(Continued)

*Primary Examiner* — Oluseye Iwarere
*Assistant Examiner* — Masoud Vaziri
(74) *Attorney, Agent, or Firm* — Rankin, Hill & Clark LLP

(57) ABSTRACT

A rotating electric machine system is equipped with a rotor including permanent magnets and a rotating shaft. The rotating shaft is supported in a rotating electric machine housing via a first bearing and a second bearing. A first oil supply passage is formed in the rotating electric machine housing for supplying lubricating oil to the first bearing and the second bearing. Further, a rotor internal oil passage is formed in the interior of the rotor. A portion of the lubricating oil is diverted away from the first oil supply passage, and is supplied to the rotor internal oil passage.

12 Claims, 15 Drawing Sheets

(56) References Cited

U.S. PATENT DOCUMENTS

| | | | | |
|---|---|---|---|---|
| 2019/0273420 A1* | 9/2019 | Yasuda | .................... | H02K 1/20 |
| 2020/0389071 A1* | 12/2020 | Sakurada | ............... | H02K 1/185 |
| 2022/0255393 A1* | 8/2022 | Yazaki | ................... | H02K 5/207 |
| 2022/0320945 A1* | 10/2022 | Yazaki | .................... | F01D 25/16 |

FOREIGN PATENT DOCUMENTS

| | | |
|---|---|---|
| JP | H09-191598 A | 7/1997 |
| JP | 2006-230098 A | 8/2006 |
| JP | 2017-147838 A | 8/2017 |
| JP | 2018-170943 A | 11/2018 |
| WO | 2016/067352 A1 | 5/2016 |
| WO | 2017/203562 A1 | 11/2017 |

OTHER PUBLICATIONS

European Search Report Corresponding to European Application No. 23190616.5, dated May 29, 2024, 15 pages.
European Search Report dated Jan. 24, 2024, European Application No. 23190616.5-1202, 16 pages.
Japanese Office Action Corresponding to JP Application No. 2022-128748, dated Oct. 1, 2025, 10 pages.

* cited by examiner

ROTATING ELECTRIC MACHINE SYSTEM, AND COMBINED POWER SYSTEM EQUIPPED THEREWITH

CROSS-REFERENCE TO RELATED APPLICATIONS

This application is based upon and claims the benefit of priority from Japanese Patent Application No. 2022-128748 filed on Aug. 12, 2022, the contents of which are incorporated herein by reference.

BACKGROUND OF THE INVENTION

Field of the Invention

The present invention relates to a rotating electric machine system. Further, the present invention relates to a combined power system in which a rotating electric machine system and an internal combustion engine are integrally constructed.

Description of the Related Art

The rotating electric machine includes a rotor having a rotating shaft, and a stator positioned on the outer circumference of the rotor. Permanent magnets are retained on the rotating shaft. When the rotating shaft rotates, an alternating magnetic field is formed by the permanent magnets and the electromagnetic coils in the stator. As a result, an induced current is generated in the electromagnetic coils. More specifically, in this case, the rotating electric machine functions as a generator.

When the induced current is continuously generated in the rotating electric machine, the rotating electric machine takes on heat. Further, when the rotating shaft is rotated at a high speed in a rotating electric machine that is small in scale, a fluid (primarily air) between the rotor and the stator becomes turbulent. As a result, wind losses (windage losses) become increased, and frictional resistance between the rotor and the stator increases. Due to such an occurrence as well, the temperature of the rotor and the stator rises.

In either case, the temperature of the permanent magnets becomes high. As the temperature of the permanent magnets approaches the Curie temperature, the magnetic force of the permanent magnets decreases. Along therewith, the output of the rotating electric machine is reduced. In order to avoid such a situation, the rotating electric machine may be cooled. For example, in JP 2006-230098 A, it is proposed that a portion of the lubricating oil of an internal combustion engine is supplied as a cooling oil for cooling the rotating electric machine. In this case, a holder that retains the permanent magnets is disposed on the rotating shaft. The lubricating oil (the cooling oil) is delivered to an annular shaped cooling oil chamber formed in the holder.

SUMMARY OF THE INVENTION

In the rotating electric machine, a rotating shaft is supported in a rotating electric machine housing via bearings. In general, a lubricating oil is supplied to the bearings in order to prevent seizure. Accordingly, in the configuration disclosed in JP 2006-230098 A, while cooling oil is supplied to the rotor, on the other hand, it is necessary to supply the lubricating oil to the bearings. More specifically, with respect to the rotating electric machine, it is necessary to individually provide an oil passage for supplying and recovering the lubricating oil, and an oil passage for supplying and recovering the cooling oil. As a result, the configuration of the rotating electric machine system becomes complicated. Further, along therewith, a concern arises in that the size and scale of the rotating electric machine system will increase.

The present invention has the object of solving the aforementioned problems.

According to one embodiment of the present invention, a rotating electric machine system is provided, which is equipped with a rotating electric machine provided with a rotor including a permanent magnet and a rotating shaft, and is equipped with a rotating electric machine housing in which the rotating shaft is rotatably supported, the rotating electric machine system including a first bearing and a second bearing that are interposed between the rotating electric machine housing and the rotating shaft, and an oil circulation supply device configured to circulate and supply lubricating oil to the first bearing and the second bearing, wherein the rotating electric machine housing includes a first oil supply passage configured to supply the lubricating oil supplied from the oil circulation supply device to the first bearing and the second bearing, and a second oil supply passage configured to branch off from the first oil supply passage and to supply the lubricating oil toward the rotor, and wherein a rotor internal oil passage, through which the lubricating oil that flows out from the second oil supply passage is made to flow, is formed in an interior of the rotor, and the rotating electric machine housing includes an oil discharge passage configured to discharge the lubricating oil, which has flowed through the first oil supply passage, the second oil supply passage, and the rotor internal oil passage, to the oil circulation supply device.

According to another embodiment of the present invention, a combined power system is provided, which is constituted to include the rotating electric machine system described above, and an internal combustion engine. In this instance, the internal combustion engine includes an output shaft configured to rotate integrally with the rotating shaft of the rotating electric machine system.

In the present invention, a portion of the lubricating oil supplied to the bearings is diverted and made to flow through the rotor internal oil passage. Based on the lubricating oil flowing in this manner, the rotor that constitutes the rotating electric machine is efficiently cooled by the lubricating oil.

Specifically, in this case, a portion of the lubricating oil is used as cooling oil for cooling the rotor. Accordingly, it is not necessary to individually provide an oil passage for supplying and recovering the lubricating oil, and an oil passage for supplying and recovering the cooling oil. Consequently, any concern that the configuration of the rotating electric machine may become complex is dispensed with. Further, any concern that the size and scale of the rotating electric machine system may increase is dispensed with.

In addition, since the rotor is cooled by the lubricating oil, the temperature of the permanent magnets that make up the rotor is prevented from reaching the Curie temperature. Therefore, a reduction in the magnetic force of the permanent magnets is suppressed. As a result, a predetermined magnetic force is generated in the alternating magnetic field that is formed between the permanent magnets and the electromagnetic coils. Therefore, an output can be obtained continuously from the rotating electric machine. Further, by the rotor being made to rotate at a high speed, it is possible to increase the output.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is an enlarged view of principal components shown in FIG. 3;

DETAILED DESCRIPTION OF THE INVENTION

Hereinafter, the respective terms "left", "right", "lower", and "upper" refer specifically to the left, right, lower, and upper directions shown particularly in FIGS. 3 to 5, FIG. 13, and FIG. 14. However, these directions are provided for the sake of convenience in order to simplify the description and to facilitate understanding. In particular, the directions described in the specification are not limited to the directions when the combined power system is actually used.

Figure 1:
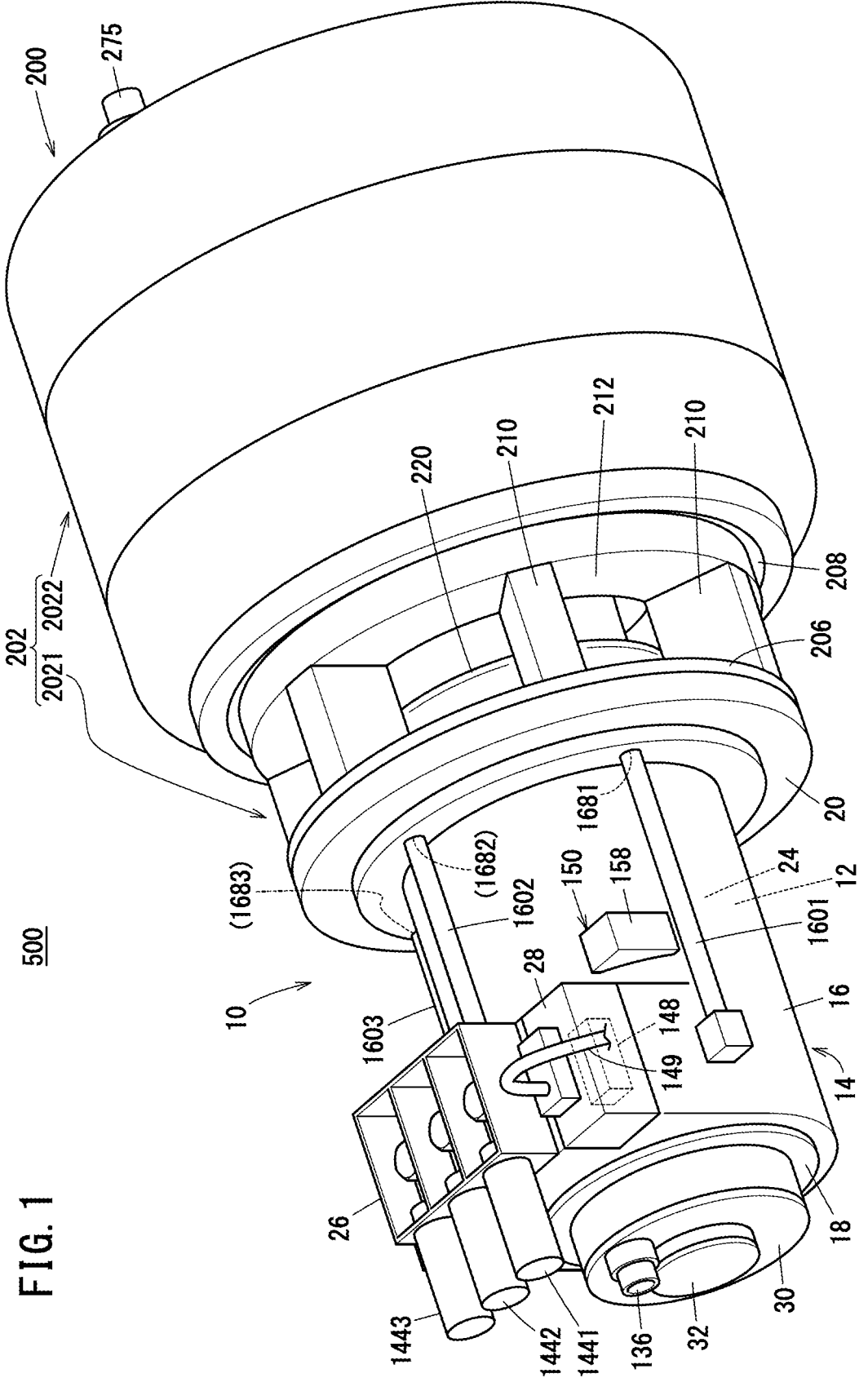
FIG. 1 is a schematic overall perspective view of a combined power system according to an embodiment of the present invention.

FIG. 1 is a schematic overall perspective view of a combined power system 500 according to a present embodiment. The combined power system 500 is equipped with a rotating electric machine system 10, and a gas turbine engine 200. An axis extending in a longitudinal direction (axial direction) through a diametrical center of the rotating electric machine system 10 coincides with an axis extending in a longitudinal direction (axial direction) through a diametrical center of the gas turbine engine 200. Stated otherwise, the rotating electric machine system 10 and the gas turbine engine 200 are arranged on the same axis.

Hereinafter, the left end in the axial direction of each of the rotating electric machine system 10 and the gas turbine engine 200 may be referred to as a first end. Similarly, the right end in the axial direction of each of the rotating electric machine system 10 and the gas turbine engine 200 may be referred to as a second end. More specifically, in the rotating electric machine system 10, the left end part which is separated away from the gas turbine engine 200 is the first end. In the rotating electric machine system 10, the right end part which is in proximity to the gas turbine engine 200 is the second end. Further, in the gas turbine engine 200, the left end part which is in proximity to the rotating electric machine system 10 is the first end. In the gas turbine engine 200, the right end part which is separated away from the rotating electric machine system 10 is the second end. According to these definitions, in the illustrated example, the gas turbine engine 200 is disposed at the second end of the rotating electric machine system 10. The rotating electric machine system 10 is disposed at the first end of the gas turbine engine 200.

The combined power system 500 is used, for example, as a power source for providing propulsion in a flying object, a ship, an automobile, or the like. Suitable specific examples of the flying object include drones and multi-copters. The combined power system 500, when mounted on a flying object, is used as a power drive source for rotationally urging, for example, a prop, a ducted fan, or the like. The combined power system 500, when mounted on a ship, is used as a screw rotational force generating device. The combined power system 500, when mounted on an automobile, is used as a power drive source for rotating a motor.

The combined power system 500 can also be used as an auxiliary power source in an aircraft, a ship, a building, or the like. Apart therefrom, it is also possible to utilize the combined power system 500 as gas turbine power generation equipment.

As will be discussed later, the gas turbine engine 200 is an internal combustion engine. Further, the gas turbine engine 200 serves as a gas supplying device that supplies compressed air (a gas).

Figure 2:
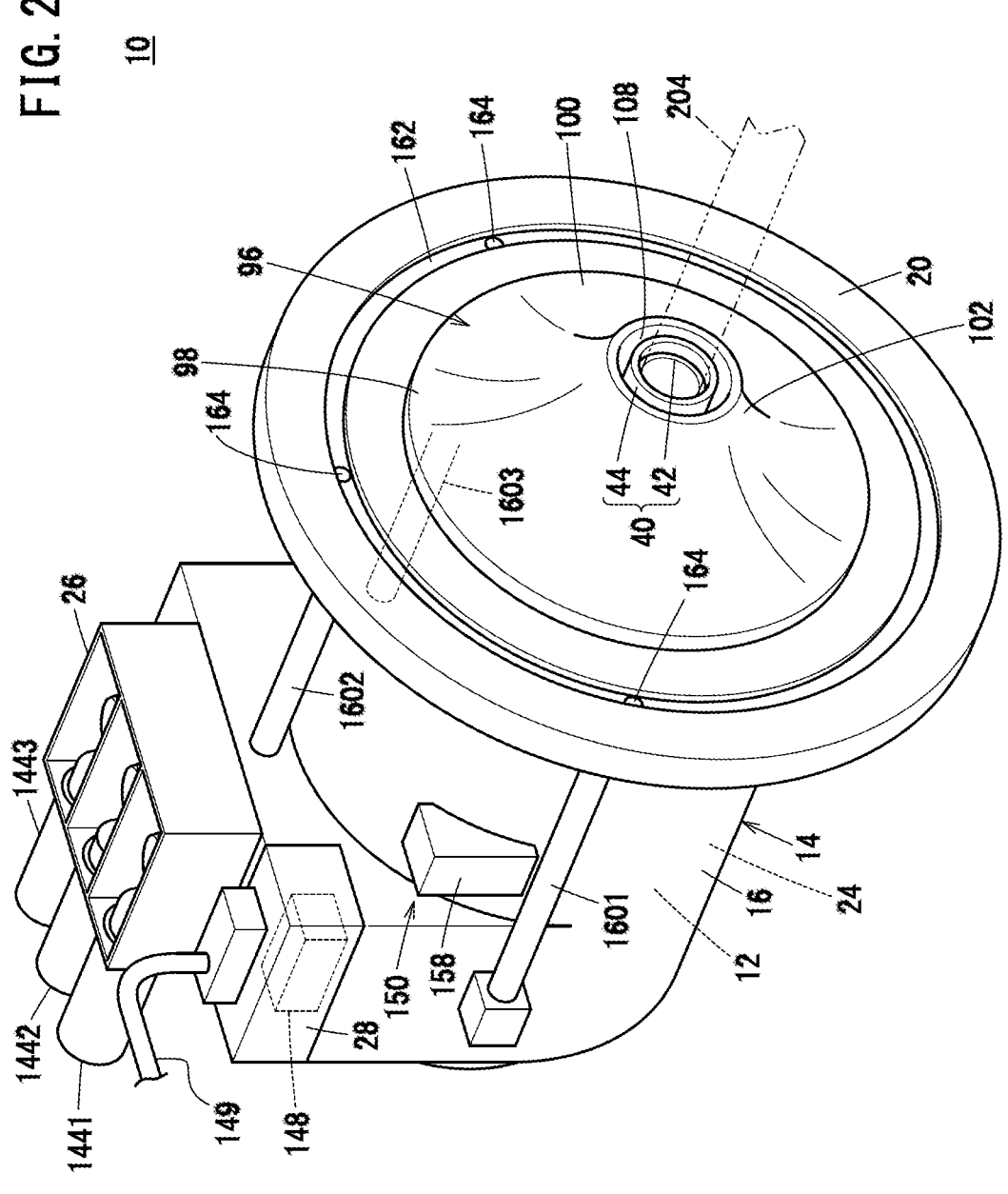
FIG. 2 is a schematic overall perspective view of a rotating electric machine system constituting part of the combined power system.
Figure 3:
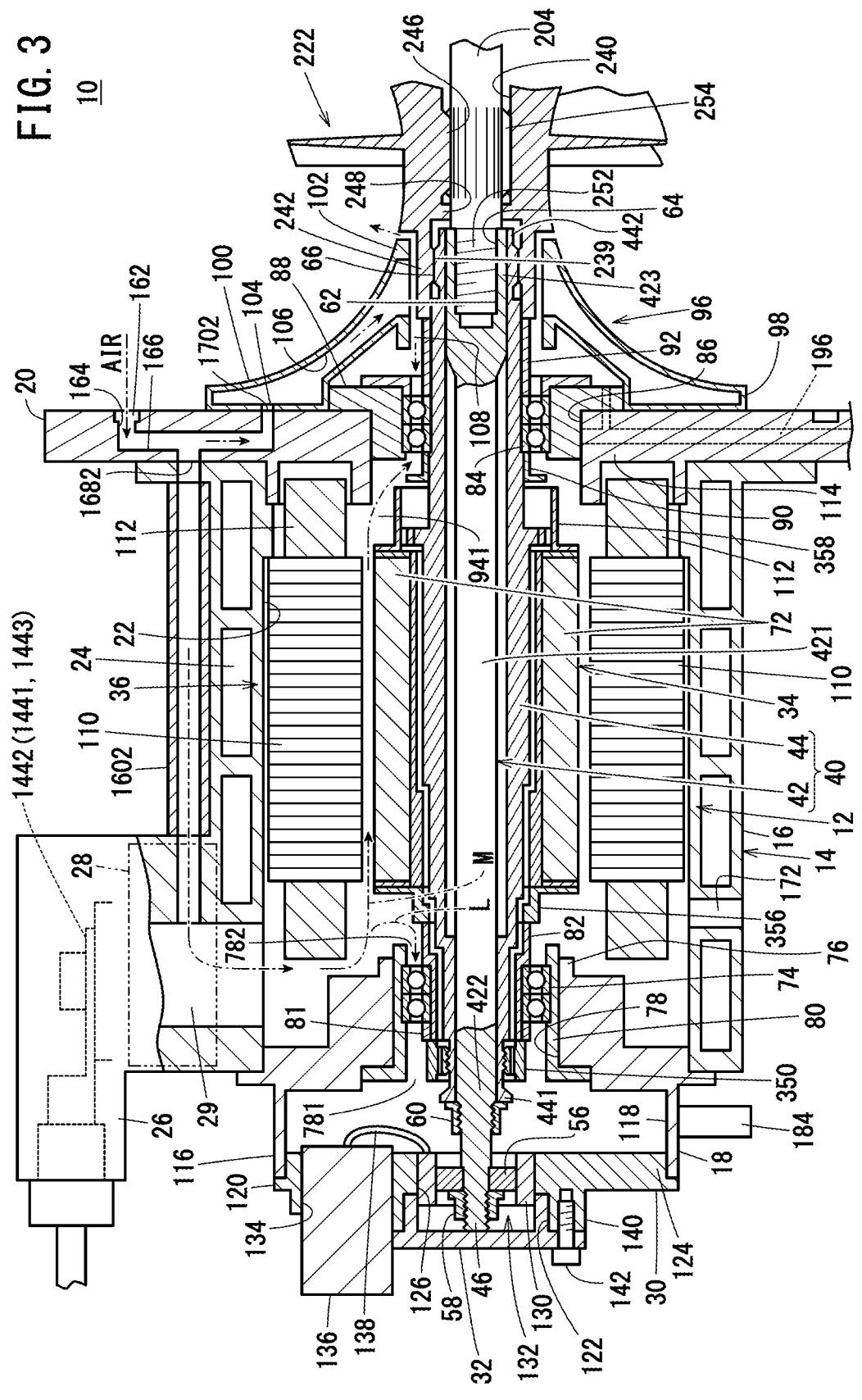
FIG. 3 is a schematic side cross-sectional view of the rotating electric machine system.

First, a description will be given concerning the rotating electric machine system 10. FIG. 2 is a schematic overall perspective view of the rotating electric machine system 10. FIG. 3 is a schematic side cross-sectional view of the rotating electric machine system 10. The rotating electric machine system 10 is equipped with a rotating electric machine 12 (for example, a generator), and a rotating electric machine housing 14 in which the rotating electric machine 12 is accommodated.

The rotating electric machine housing 14 includes a main housing 16, a first sub-housing 18, and a second sub-housing 20. The main housing 16 exhibits a generally cylindrical shape, and both a first end and a second end thereof are open ends. The first sub-housing 18 is connected to the first end (the left open end) of the main housing 16. The second sub-housing 20 is connected to the second end (the right open end) of the main housing 16. In accordance with the foregoing, the first end and the second end of the main housing 16 are closed.

The main housing 16 has a thick side wall that extends in a left-right direction. A hollow interior portion is formed in the main housing 16. Such a hollow interior portion serves as an accommodation chamber 22. The majority of the components of the rotating electric machine 12 are accommodated in the accommodation chamber 22.

A spiral shaped cooling jacket 24 is formed in the interior of a side wall of the main housing 16. A cooling medium flows through the cooling jacket 24. As a specific example of the cooling medium, there may be cited cooling water. In this case, the cooling jacket 24 is a water jacket.

A first casing 26 and a second casing 28 are provided in the vicinity of an edge of the first end on an outer surface (an outer wall) of the side wall of the main housing 16. The first casing 26 and the second casing 28 serve as one portion of the main housing 16. More specifically, the first casing 26 and the second casing 28 are disposed integrally with the main housing 16. As will be discussed later, the first casing 26 is a terminal casing. The second casing 28 is a measurement instrument casing.

The first casing 26 includes a first internal space 29. The second casing 28 includes a non-illustrated second internal space. The first internal space 29 and the second internal space are placed in communication with each other through non-illustrated mutual communication holes. Further, the first internal space 29 is in communication with the accommodation chamber 22.

A retaining member that retains a rotational parameter detector is connected to the first sub-housing 18. According to the present embodiment, as the rotational parameter detector, a resolver 132 is exemplified. Accordingly, hereinafter, the retaining member of the detector will be referred to as a "resolver holder 30". As will be discussed later, a cap cover 32 is connected via screws to the resolver holder 30.

The rotating electric machine 12 includes a rotor 34, and a stator 36 that surrounds an outer circumference of the rotor 34.

The rotor 34 includes a rotating shaft 40. The rotating shaft 40 includes an inner shaft 42, and a hollow cylindrical shaped outer shaft 44. Both ends of the outer shaft 44 are open ends. More specifically, the outer shaft 44 has a left open end 441 (refer to FIG. 4) and a right open end 442 (refer to FIG. 5). The inner shaft 42 is removably inserted in the interior of the outer shaft 44.

The inner shaft 42 is longer in comparison with the outer shaft 44. The inner shaft 42 includes a cylindrical columnar part 421, a left end part 422 (refer to FIG. 4), and a right end part 423 (refer to FIG. 5). The left end part 422 connects to the left side of the cylindrical columnar part 421. Accordingly, the left end part 422 is an end (a first end) of the inner shaft 42 that is separated away from the gas turbine engine 200. The right end part 423 connects to the right side of the cylindrical columnar part 421. Accordingly, the right end part 423 is an end (a second end) of the inner shaft 42 that is in proximity to the gas turbine engine 200. The diameter of the cylindrical columnar part 421 is smaller than the diameter of the left end part 422 and the right end part 423. Further, the diameter of the right end part 423 is smaller than the diameter of the left end part 422.

One portion of the left end part 422 is exposed from the left open end 441 of the outer shaft 44. The portion exposed from the left open end 441 is a projecting distal end 46, which will be described later. Moreover, in the illustrated example, the right end part 423 of the inner shaft 42 and the right open end 442 of the outer shaft 44 are flush with each other. However, the right end part 423 may be positioned slightly in proximity to the second end relative to the right open end 442.

Figure 4:
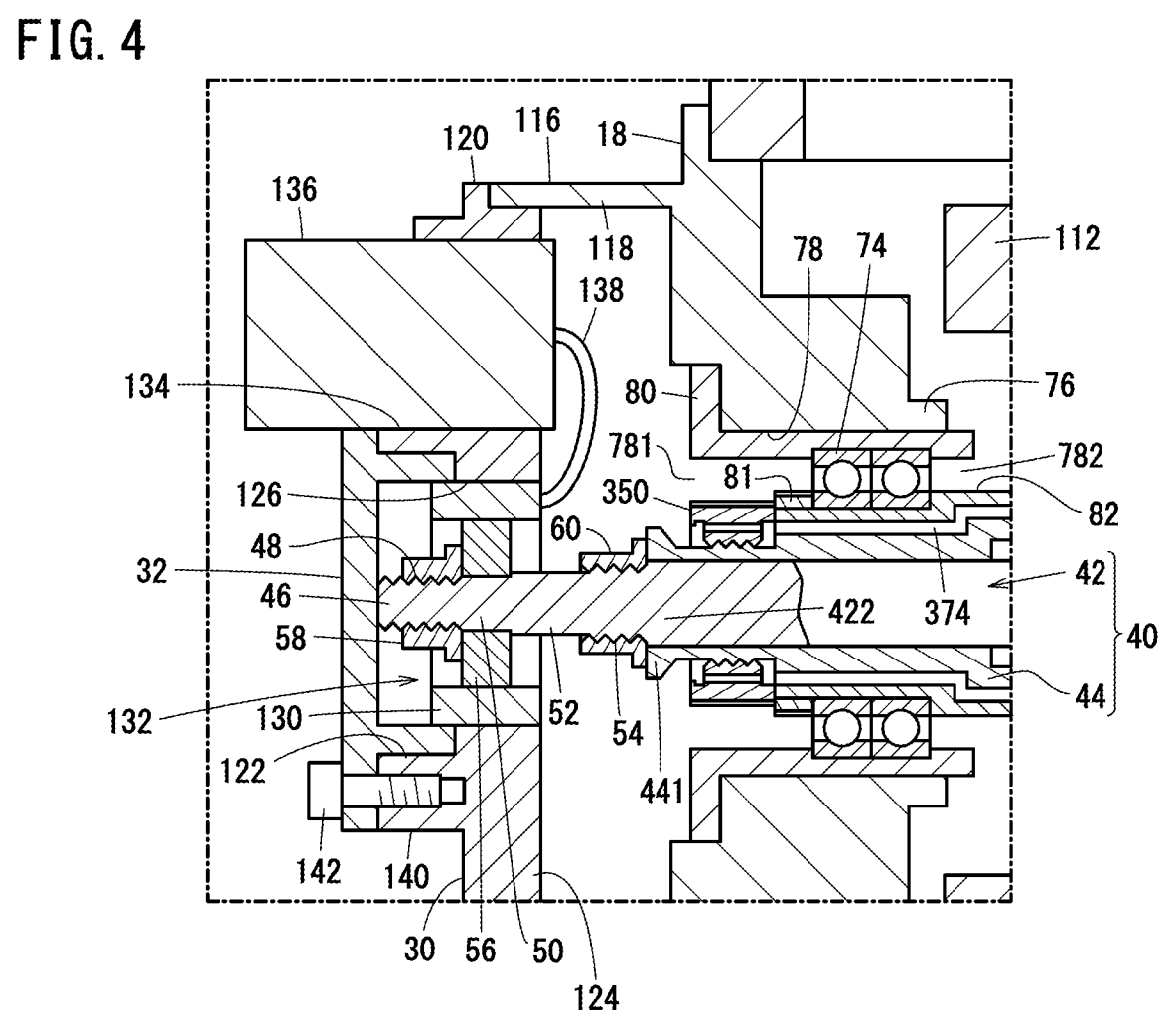

As shown in detail in FIG. 4, a first externally threaded portion 48, a flange portion 50, a stopper portion 52, and a second externally threaded portion 54 are provided sequentially in this order toward the right on the left end part 422 of the inner shaft 42. The outer diameters of the first externally threaded portion 48, the flange portion 50, the stopper portion 52, and the second externally threaded portion 54 become larger in this order. The outer diameter of the second externally threaded portion 54 is larger in comparison with the inner diameter of the outer shaft 44. Therefore, the right end of the second externally threaded portion 54 abuts against the edge of the left open end 441 of the outer shaft 44. Accordingly, in the inner shaft 42, a portion thereof on the left relative to the second externally threaded portion 54 is not inserted into the outer shaft 44.

A resolver rotor 56 is attached to the flange portion 50. Further, a small cap nut 58 is screw-engaged with the first externally threaded portion 48. A right end of the resolver rotor 56 is positioned by the stopper portion 52. A left end of the resolver rotor 56 is pressed by the small cap nut 58. In accordance with the foregoing, the resolver rotor 56 is positioned and fixed to the flange portion 50.

Further, a large cap nut 60 is screwed-engaged with the second externally threaded portion 54. A right end of the large cap nut 60 covers an outer circumferential wall of the left open end 441 of the outer shaft 44. In accordance with this feature, the left end part 422 of the inner shaft 42 is restrained by the left open end 441 of the outer shaft 44. Both the first externally threaded portion 48 and the second externally threaded portion 54 are so-called reverse threads. Accordingly, when screw-engaged, the small cap nut 58 and the large cap nut 60 are rotated counterclockwise. After being screw-engaged, it is preferable to partially deform the screw threads of the small cap nut 58 and the large cap nut 60. In accordance with this feature, the small cap nut 58 and the large cap nut 60 are prevented from becoming loosened.

Figure 5:
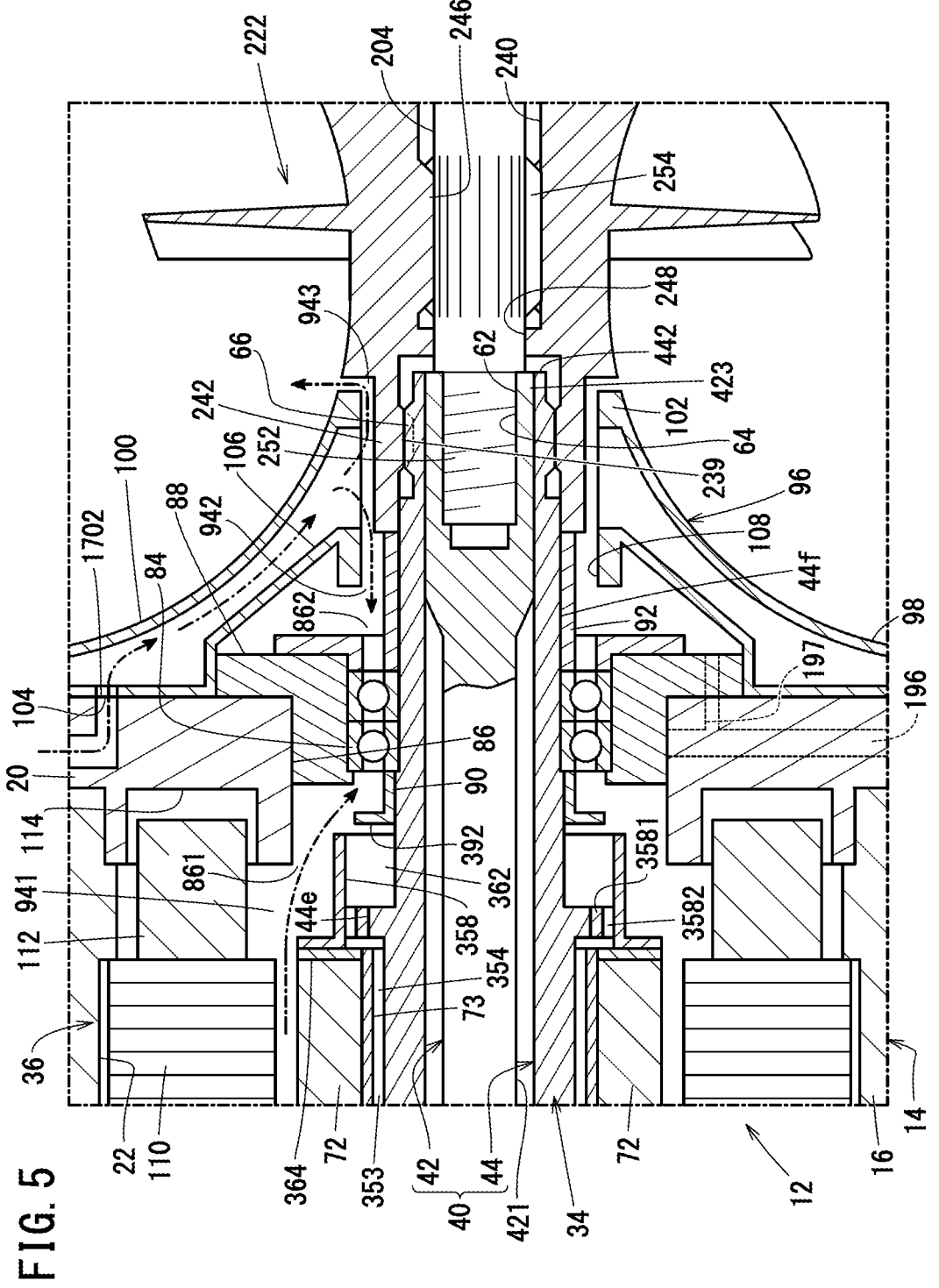
FIG. 5 is an enlarged view of the principal components shown in FIG. 3, at a location that differs from that shown in FIG. 4.

As shown in FIG. 5, a connecting hole 62 is formed in the right end part 423 which is the second end of the inner shaft 42. The connecting hole 62 extends toward the left end part 422 which is the first end. A female threaded portion 64 is engraved on an inner circumferential wall of the connecting hole 62. The left end of an output shaft 204 is inserted into the connecting hole 62. The left end of the output shaft 204 is coupled to the inner shaft 42 by being screw-engaged with the female threaded portion 64. A compressor wheel 222 and a turbine wheel 224 (refer to FIG. 13) are retained on the output shaft 204.

Further, a first inner spline 66 is formed on the outer circumferential wall of the right open end 442 of the outer shaft 44. The first inner spline 66 extends in the axial direction (left-right direction) of the rotating electric machine system 10.

Figure 6:
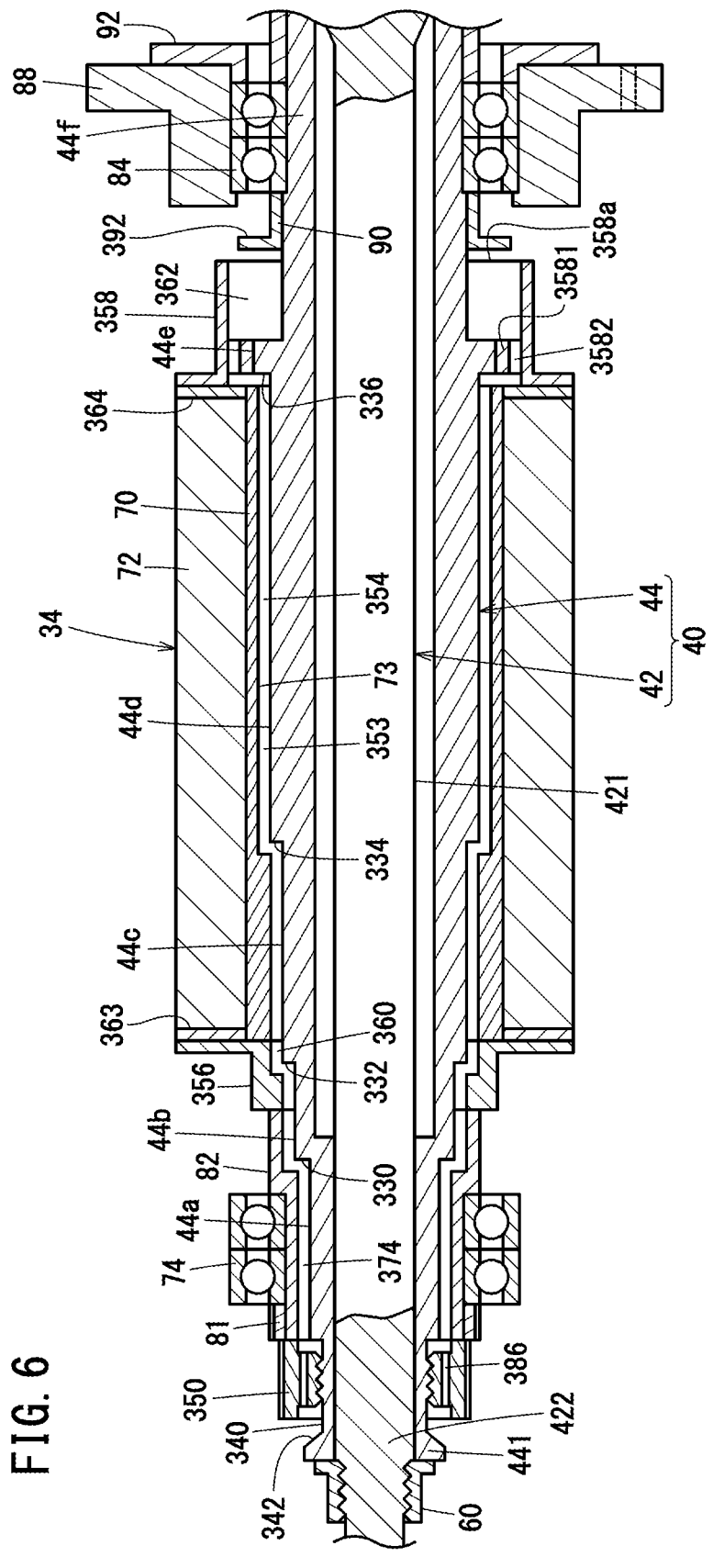
FIG. 6 is a side cross-sectional view of principal components, showing an outer shaft that constitutes a rotating shaft, and constituent members provided on the outer shaft.

As shown in detail in FIG. 6, the outer shaft 44 includes in this order a first shaft portion 44*a* to a sixth shaft portion 44*f* in a direction from the first end to the second end. In the first shaft portion 44*a* to the sixth shaft portion 44*f*, the outer diameters (diameters) thereof differ from each other. Specifically, the outer diameter increases from the first shaft portion 44*a* toward the fifth shaft portion 44*e*. In particular, for example, the second shaft portion 44*b* is a portion that is larger in diameter than the first shaft portion 44*a*, and further, is a portion that is smaller in diameter than the third shaft portion 44*c*. Similarly, the third shaft portion 44*c* is a portion that is larger in diameter than the second shaft portion 44*b*, and further, is a portion that is smaller in diameter than the fourth shaft portion 44*d*. In this manner, from the first shaft portion 44*a* to the fifth shaft portion 44*e*, the outer shaft 44 changes from being a small diameter portion to a large diameter portion. In contrast thereto, the outer diameter of the sixth shaft portion 44*f* is smaller than the outer diameters of the third shaft portion 44*c* to the fifth shaft portion 44*e*.

A first stepped portion 330 is formed between the first shaft portion 44*a* and the second shaft portion 44*b*, based on a difference in the outer diameters (a diametrical difference) between both of the shaft portions 44*a* and 44*b*. A second stepped portion 332 is formed between the second shaft portion 44*b* and the third shaft portion 44*c*, based on a difference in the outer diameters between both of the shaft portions 44*b* and 44*c*. A third stepped portion 334 is formed between the third shaft portion 44*c* and the fourth shaft portion 44*d*, based on a difference in the outer diameters between both of the shaft portions 44*c* and 44*d*. A fourth stepped portion 336 is formed between the fourth shaft portion 44*d* and the fifth shaft portion 44*e*, based on a difference in the outer diameters between both of the shaft portions 44*d* and 44*e*.

As will be discussed later, the first stepped portion 330, the second stepped portion 332, the third stepped portion 334, and the fourth stepped portion 336 serve as direction changeover portions that change the direction through which the lubricating oil flows. Moreover, according to the present embodiment, the first stepped portion 330, the second stepped portion 332, the third stepped portion 334, and the fourth stepped portion 336 are shown as vertical surfaces. However, at least one of the first stepped portion 330, the second stepped portion 332, the third stepped portion 334, or the fourth stepped portion 336 may be an inclined surface.

Figure 7:
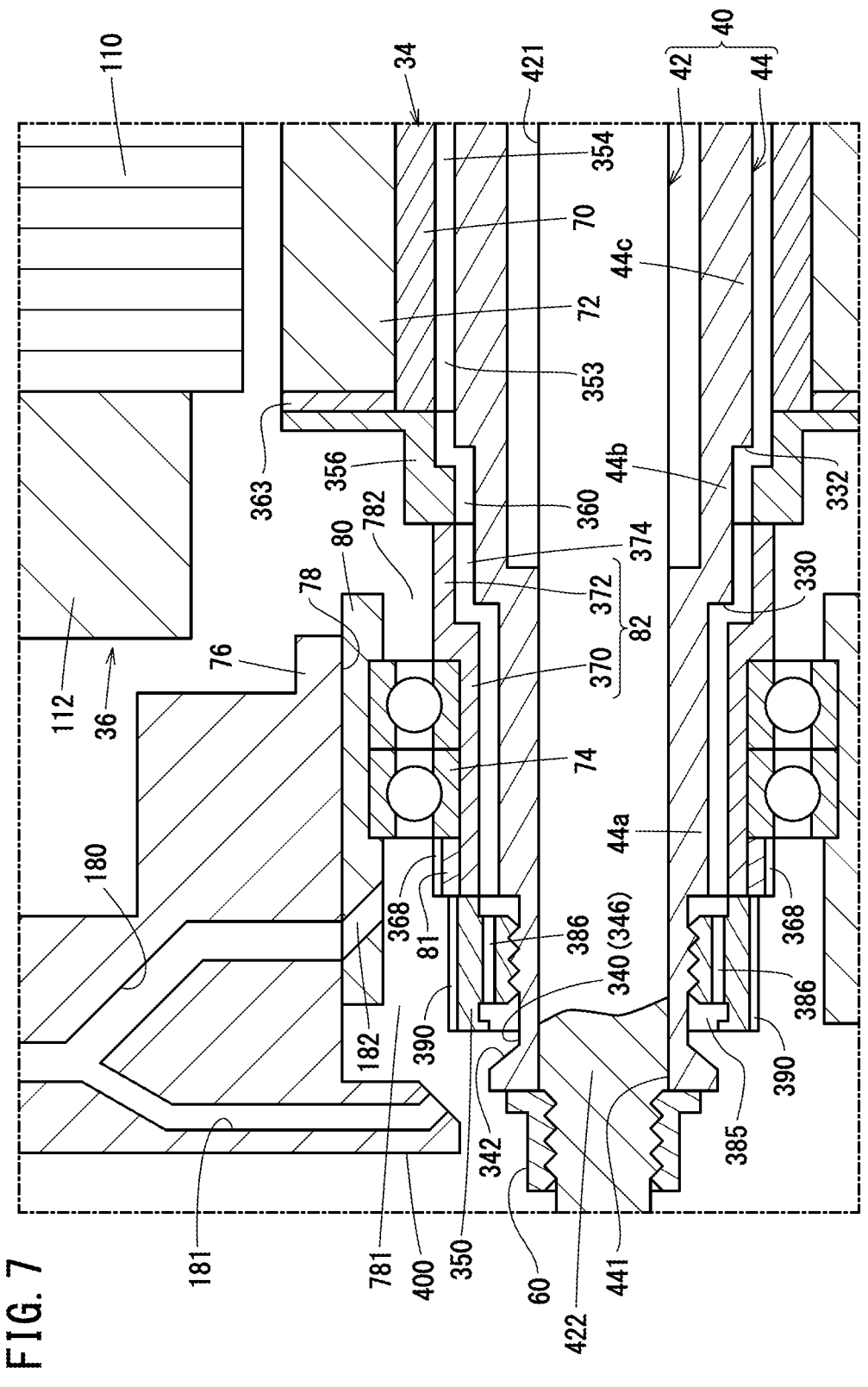
FIG. 7 is a side cross-sectional view of the vicinity of one end part (a left open end) of the outer shaft as viewed perpendicular to an axial direction.
Figure 8:
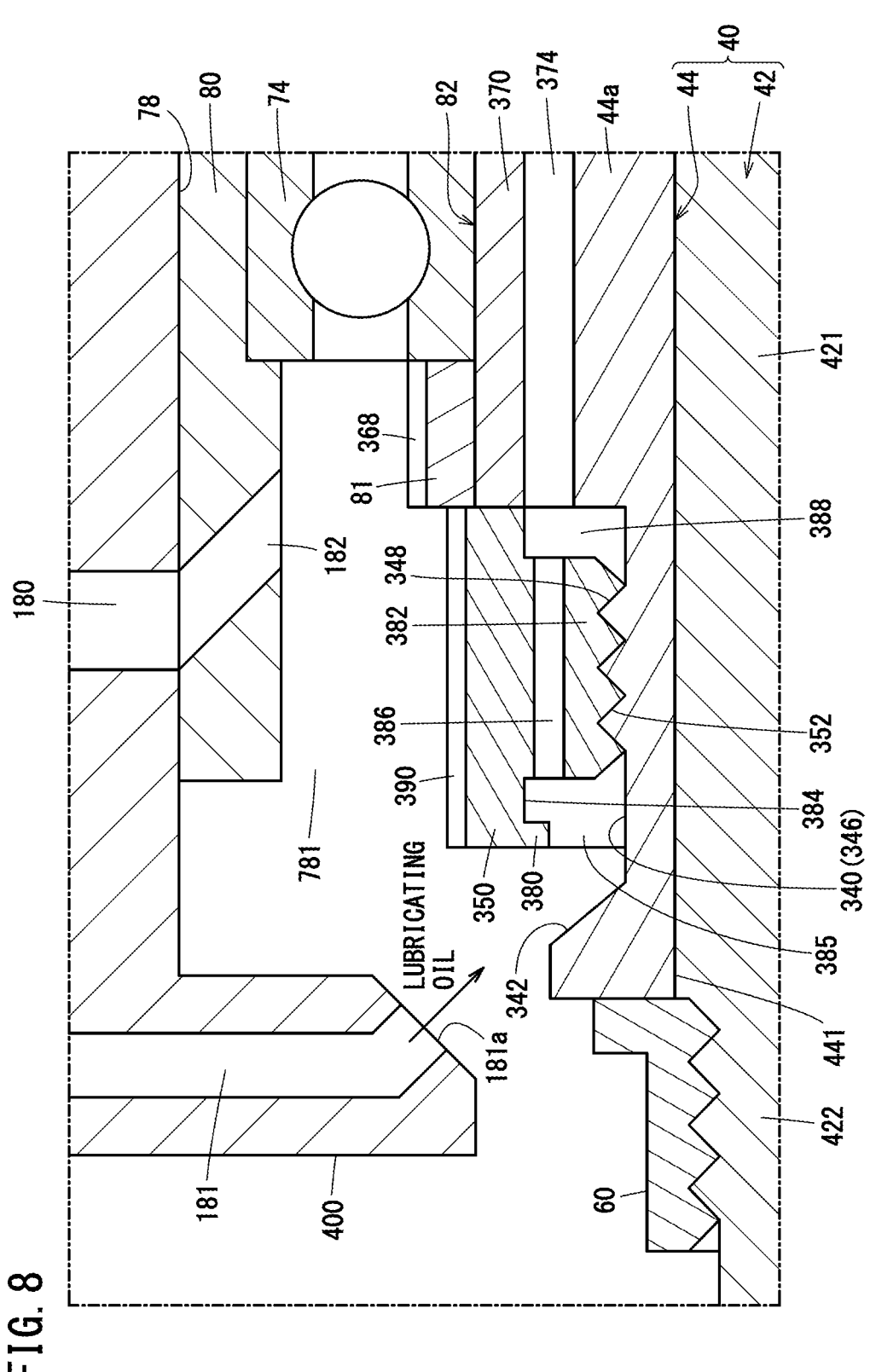
FIG. 8 is an enlarged view of principal components shown in FIG. 7.

FIG. 7 is a side cross-sectional view of the vicinity of the left open end 441 of the outer shaft 44 as viewed perpendicular to an axial direction. FIG. 8 is an enlarged view of principal components shown in FIG. 7. As shown in FIG. 7 and FIG. 8, an oil receiving concave portion 340 is formed in proximity to the first end of the first shaft portion 44*a*. The oil receiving concave portion 340 is an annular shaped concave portion formed on the outer surface of the first shaft portion 44*a*.

A side wall facing toward the first end of the oil receiving concave portion 340 is an inclined surface 342 that is inclined in a manner so as to be closer to the inner shaft 42 as it progresses from the first end toward the second end. The angle of inclination of the inclined surface 342 is approximately equivalent to the angle of inclination of the outlet of a second auxiliary oil passage 181. A bottom surface 346 of the oil receiving concave portion 340 connects to the inclined surface 342. The bottom surface 346 is formed on the outer shaft 44 on a portion thereof having a constant outer diameter.

In the first shaft portion 44*a*, an annular shaped first threaded portion 348 is formed on the second end side thereof relative to the oil receiving concave portion 340. A second threaded portion 352 of an oil guiding member 350 is screw-engaged with the first threaded portion 348.

The rotating shaft 40 includes the oil guiding member 350 which is made up from an annular shaped body. Specifically, concerning the oil guiding member 350, the oil guiding member 350 is positioned and fixed to the outer circumferential wall of the first shaft portion 44*a*. More specifically, as noted previously, the first threaded portion 348 is formed on the first shaft portion 44*a*, and the second threaded portion 352 is formed on the oil guiding member 350 (refer to FIG. 7 and FIG. 8). By the second threaded portion 352 being screw-engaged to (placed in engagement with) the first threaded portion 348, the oil guiding member 350 is positioned and fixed to the first shaft portion 44*a*.

As shown in FIG. 7 and FIG. 8, an annular projecting member 380 is disposed on a first end edge portion of the oil guiding member 350. The annular projecting member 380 projects out in a radially inward direction of the oil guiding member 350. Further, an annular convex portion 382 is provided on the inner circumferential wall of the oil guiding member 350. The annular convex portion 382 projects out in a radially inward direction of the oil guiding member 350, at a position closer to the second end than the annular projecting member 380 is. The amount by which the annular convex portion 382 projects is greater than the amount by which the annular projecting member 380 projects.

Due to the annular projecting member 380 and the annular convex portion 382, an annular groove 384 is formed in the interior of the oil guiding member 350 on a side of the first end. The annular groove 384 faces toward the bottom surface 346 of the oil receiving concave portion 340. In this manner, the oil guiding member 350 is positioned in facing relation to the oil receiving concave portion 340 that is formed in the rotating shaft 40 (the first shaft portion 44*a* of the outer shaft 44). An annular gap 385 that allows the lubricating oil to be received by the oil guiding member 350 is formed between the oil guiding member 350 and the rotating shaft 40. Specifically, the annular gap 385 is formed between the oil receiving concave portion 340 and the annular projecting member 380.

As will be discussed later, the annular gap 385 serves as an inlet of a rotor internal oil passage 354. Further, the outlet of the rotor internal oil passage 354 serves as an opening that faces toward the second end in a hole portion of a second magnet stopper 358. In this manner, the inlet of the rotor internal oil passage 354 is disposed outwardly of a first bearing 74 in the axial direction of the rotating shaft 40. On the other hand, the outlet of the rotor internal oil passage 354 is disposed inwardly of a second bearing 84 in the axial direction of the rotating shaft 40.

As shown in FIG. 8, a plurality of first oil delivery passages 386 are formed in the annular convex portion 382. The first oil delivery passages 386 extend in the axial direction of the rotating shaft 40 (refer to FIG. 7). Outlets of the plurality of the first oil delivery passages 386 connect to an annular space 388. The annular space 388 is a space that is formed in the interior of the second end of the oil guiding member 350. The annular space 388 communicates with a flow through space 374 which is a portion of the rotor internal oil passage 354. Stated otherwise, the first oil delivery passages 386 communicate with the rotor internal oil passage 354 via the annular space 388.

The second threaded portion 352 is a convex portion that is projected out further inward in the radial direction from the annular convex portion 382. The length in the axial direction of the rotating shaft 40 at the annular convex portion 382 is slightly greater than the length in the axial direction of the rotating shaft 40 at the second threaded portion 352.

A plurality of individual upstream guide grooves 390 (first guide grooves) are formed in the outer circumferential wall of the oil guiding member 350. Two individual ones of the upstream guide grooves 390 that are adjacent to each other are separated, for example, by 60°.

A first outer stopper 81, which is one of the bearing stoppers, is provided at the second end of the first shaft portion 44*a*. A first inner stopper 82, which is one of the bearing stoppers, is provided on the second shaft portion 44*b*. The first bearing 74 is sandwiched between the first outer stopper 81 and the first inner stopper 82. A description will be given later concerning the aforementioned feature.

As shown in FIG. 6, permanent magnets 72 are retained on the third shaft portion 44*c* to the fifth shaft portion 44*e* via a tubular member 70. The rotor 34 is constituted by including the rotating shaft 40, the tubular member 70, and the permanent magnets 72. An inner hole 73 that extends in the axial direction of the tubular member 70 is formed in the tubular member 70. The rotating shaft 40 is passed through the inner hole 73. Accordingly, in the radial direction of the rotating shaft 40, the tubular member 70 is interposed between the rotating shaft 40 and the permanent magnets 72. In the inner hole 73, the inner diameter thereof is formed to be larger at a portion thereof corresponding to the third stepped portion 334.

As the rotating shaft 40 undergoes rotation, the permanent magnets 72 move along a circumference of a predetermined virtual circle about the center of rotation of the rotating shaft 40.

The tubular member 70 and the permanent magnets 72 are sandwiched between a first magnet stopper 356 and the second magnet stopper 358 in the axial direction of the rotating shaft 40. In accordance with this feature, the tubular member 70 is positioned on the third shaft portion 44*c* to the fifth shaft portion 44*e*. More specifically, a positional deviation (i.e., shifting in position) from the third shaft portion 44*c* to the fifth shaft portion 44*e* of the tubular member 70 and the permanent magnets 72 is prevented. In this manner, the first magnet stopper 356 and the second magnet stopper 358 serve to position the permanent magnets 72.

The first magnet stopper 356 straddles the second end of the second shaft portion 44*b* and the first end of the third shaft portion 44*c*. The second magnet stopper 358 covers the outer surface of the fifth shaft portion 44*e*. Moreover, a first ring body 363 is sandwiched between the first magnet stopper 356 and the permanent magnets 72. Similarly, a second ring body 364 is sandwiched between the permanent magnets 72 and the second magnet stopper 358. The first end and the second end of the tubular member 70 are each passed through respective through holes of the first ring body 363 and the second ring body 364.

An inward projecting member 3581 is provided on an inner circumferential wall of the hole portion of the second magnet stopper 358. The inward projecting member 3581 projects out in an annular shape inwardly in the radial direction of the hole portion. An inner circumferential wall of the inward projecting member 3581 contacts a top surface of the fourth stepped portion 336. A plurality of second oil delivery passages 3582 are formed in the inward projecting member 3581. The plurality of second oil delivery passages 3582 are arranged alongside one another in the circumferential direction of the inward projecting member 3581. Individual ones of the second oil delivery passages 3582 extend in the axial direction of the rotating shaft 40.

As shown in FIG. 3, a left end (a first end) of the rotating shaft 40 is rotatably supported in the first sub-housing 18 via the first bearing 74. The first bearing 74 is inserted between the outer shaft 44 and the first sub-housing 18. Specifically, as shown in FIG. 3 and FIG. 7, the first sub-housing 18 includes a cylindrical columnar shaped projecting member 76 that is projected out toward the main housing 16. A first insertion hole 78 is formed in the cylindrical columnar shaped projecting member 76. A first bearing holder 80 by which the first bearing 74 is retained is inserted into the first insertion hole 78. Accordingly, the first bearing 74 is arranged in the first insertion hole 78.

The first insertion hole 78 extends in the left-right direction. The left end of the first insertion hole 78 is separated farther away from the output shaft 204 than the right end of the first insertion hole 78 is. Hereinafter, the left end of the first insertion hole 78 may also be referred to as a "first distal end 781". On the other hand, the right end of the first insertion hole 78 is closer to the output shaft 204 than the left end (the first distal end 781) of the first insertion hole 78 is. Hereinafter, the right end of the first insertion hole 78 may also be referred to as a "first proximal end 782".

In particular, as shown in FIG. 7, the first outer stopper 81 is provided at the first end of the first shaft portion 44*a*. The first outer stopper 81 is an annular shaped body, and a plurality of individual downstream guide grooves 368 (second guide grooves) are formed in the outer circumferential wall. Two individual ones of the downstream guide grooves 368 that are adjacent to each other are separated, for example, by 60°. Although it is preferable for the phases of the upstream guide grooves 390 and the downstream guide grooves 368 to coincide, even if they do not coincide, no particular problem arises.

The first inner stopper 82 is provided on the second shaft portion 44*b*. The first inner stopper 82 has a small diameter cylindrical portion 370 having a small outer diameter, and a large diameter cylindrical portion 372 having a large outer diameter. The inner diameters of the small diameter cylindrical portion 370 and the large diameter cylindrical portion 372 are substantially the same as each other. As can be understood from this feature, the first inner stopper 82 is of a cylindrical shape having a hole provided therein. The first inner stopper 82 covers the outer surface of the second shaft portion 44*b*, in a manner so that the small diameter cylindrical portion 370 faces toward the first end, and further, the large diameter cylindrical portion 372 faces toward the second end.

In the foregoing description, the flow through space 374, which is of an annular shape, is formed between the first shaft portion 44*a* and the second shaft portion 44*b*, and the inner circumferential wall of the first inner stopper 82. A flow through space 360, which is of an annular shape, is also formed between the outer surfaces of the second shaft portion 44*b* and the third shaft portion 44*c*, and the inner circumferential wall of the hole portion of the first magnet stopper 356. A flow through space 353, which is of an annular shape, is also formed between the outer surfaces of the third shaft portion 44*c* to the fifth shaft portion 44*e*, and the inner wall of the inner hole 73 of the tubular member 70. A flow through space 362, which is of an annular shape, is also formed between the outer surface of the sixth shaft portion 44*f*, and the inner circumferential wall of the hole portion of the second magnet stopper 358. The rotor internal oil passage 354 is formed by the flow through spaces 374, 360, 353, and 362 being connected to each other. The flow through space 353 and the flow through space 362 are connected via the second oil delivery passages 3582.

The rotor internal oil passage 354 is a flow passage that extends in the axial direction of the rotating shaft 40, and for example, may be an annular space that extends partially in the axial direction. The rotor internal oil passage 354 extends from the first end to the second end of the permanent magnets 72 in the axial direction of the rotating shaft 40. The rotor internal oil passage 354 may be a groove or the like.

An end surface of the second end of the oil guiding member 350 abuts against the end surface of the first end of the small diameter cylindrical portion 370. The end surface of the first end of the first magnet stopper 356 abuts against the end surface of the second end of the large diameter cylindrical portion 372. Further, the first outer stopper 81 is positioned and fixed to the outer circumferential wall of the first end of the small diameter cylindrical portion 370. The first bearing 74 is arranged on the outer circumference of the small diameter cylindrical portion 370, and further, is sandwiched between the end surface of the second end of the first outer stopper 81, and the end surface of the first end of the large diameter cylindrical portion 372.

The distal end of the left end part of the rotating shaft 40 passes through the first insertion hole 78 after having passed through an inner hole of the first bearing 74. The distal end of the left end part of the rotating shaft 40 is further exposed on an outer side (a hollow concave portion 118) of the cylindrical columnar shaped projecting member 76. Hereinafter, the portion of the rotating shaft 40 that is projected out from the left end of the first bearing 74 is referred to as the "projecting distal end 46". Within the left end part 422 of the inner shaft 42, the first externally threaded portion 48, the flange portion 50, the stopper portion 52, and the second externally threaded portion 54 are included on the projecting distal end 46 (refer to FIG. 4).

The second bearing 84 is provided on the sixth shaft portion 44f of the outer shaft 44. The second bearing 84 rotatably supports the right end (a second end) of the rotating shaft 40 on the second sub-housing 20. As shown in FIG. 5, the second bearing 84 is inserted between the outer shaft 44 and the second sub-housing 20 which exhibits a substantially disk shape.

The second sub-housing 20 is connected to the main housing 16 via non-illustrated bolts. The center of the second sub-housing 20 is in the form of a thick-walled cylindrical shaped portion. A second insertion hole 86 is formed in such a cylindrical shaped portion. The second insertion hole 86 extends in the left-right direction. The left end of the second insertion hole 86 is separated farther away from the output shaft 204 than the right end of the second insertion hole 86 is. Hereinafter, the left end of the second insertion hole 86 may also be referred to as a "second distal end 861". On the other hand, the right end of the second insertion hole 86 is closer to the output shaft 204 than the left end (the second distal end 861) of the second insertion hole 86 is. Hereinafter, the right end of the second insertion hole 86 may also be referred to as a "second proximal end 862".

A second bearing holder 88 by which the second bearing 84 is retained is inserted into the second insertion hole 86. Accordingly, the second bearing 84 is arranged in the second insertion hole 86. The second bearing 84 is sandwiched between a second inner stopper 90 positioned at the second distal end 861, and a second outer stopper 92 positioned at the second proximal end 862. Based on being sandwiched in this manner, the second bearing 84 is positioned and fixed to the sixth shaft portion 44f. In this manner, the second inner stopper 90 and the second outer stopper 92 serve as the bearing stoppers.

The rotor 34 includes a disk portion 392 as shown in FIG. 3 and FIG. 6. The disk portion 392 is disposed at the first end of the second inner stopper 90, and is a protruding portion that protrudes outward in the radial direction of the rotating shaft 40 on the outer circumference of the rotating shaft 40. The disk portion 392 is positioned between the permanent magnets 72 and the second bearing 84, and partially covers an opening 358a of a hole portion of the second magnet stopper 358. More specifically, in this case, the disk portion 392 is a shield member provided at an outlet (the outlet of the rotor internal oil passage 354) of the flow through space 362. The disk portion 392 faces toward the second bearing 84 in the axial direction of the rotating shaft 40. Based on the fact that the disk portion 392 partially shields the outlet of the flow through space 362, the lubricating oil that is in contact with the second bearing 84 is separated away from the lubricating oil that has flowed out from the rotor internal oil passage 354. The disk portion 392 is closer to the inner side (the first end) than the second bearing 84 is.

Further, at the second distal end 861, a clearance is formed between the second inner stopper 90 and the second bearing holder 88. This clearance defines a third sub-branching passage 941.

As shown in FIG. 2 and FIG. 3, in the second sub-housing 20, a rectifying member 96 is connected to the end surface facing toward the gas turbine engine 200. The rectifying member 96 includes a base portion 98, a reduced diameter portion 100, and a top portion 102. The base portion 98 which faces toward the second sub-housing 20 has a large diameter and a thin cylindrical plate shape. The top portion 102 which faces toward the gas turbine engine 200 has a small diameter and a relatively long cylindrical plate shape. In the reduced diameter portion 100 between the base portion 98 and the top portion 102, the diameter thereof gradually becomes smaller. Accordingly, the rectifying member 96 is a mountain (chevron) shaped body or a bottomless cup shaped body. The outer surface of the reduced diameter portion 100 is a smooth surface with a small surface roughness.

In the base portion 98, inlets 104 are formed in an end surface thereof facing toward the second sub-housing 20. Further, the reduced diameter portion 100 is hollow. More specifically, a relay chamber 106 is formed in the interior of the reduced diameter portion 100. The inlets 104 serve as inlets for the compressed air to enter into the relay chamber 106.

An insertion hole 108 is formed in the top portion 102 in the left-right direction. A diameter (an opening diameter) of the insertion hole 108 is larger than the outer diameter of a portion of the second outer stopper 92 that extends along the rotating shaft 40. Therefore, a portion of the second outer stopper 92 that has entered into the insertion hole 108, and the outer circumferential wall thereof are separated away from the inner wall of the insertion hole 108. Stated otherwise, a clearance is formed between the outer circumferential wall of the second outer stopper 92 and the inner wall of the insertion hole 108. This clearance defines a fourth sub-branching passage 942. The relay chamber 106 becomes wider as it comes closer to the insertion hole 108 and the fourth sub-branching passage 942.

Further, a diameter (opening diameter) of the insertion hole 108 is larger than the outer diameter of the relatively small left end (a small diameter cylindrical portion 242) of the compressor wheel 222. Therefore, the small diameter cylindrical portion 242 that has entered into the insertion hole 108 is also separated away from the inner wall of the insertion hole 108. Stated otherwise, a clearance is formed between the outer circumferential wall of the small diameter cylindrical portion 242 and the inner wall of the insertion hole 108. This clearance defines an outlet passage 943.

As shown in FIG. 3, the first insertion hole 78 and the third sub-branching passage 941 communicate with the accommodation chamber 22. Therefore, the first bearing 74 and the second bearing 84 are exposed in the accommodation chamber 22.

The stator 36 constitutes the rotating electric machine 12 together with the aforementioned rotor 34. The stator 36 includes electromagnetic coils 110 and a plurality of insulating substrates 112. The electromagnetic coils 110 include three types of coils, including a U-phase coil, a V-phase coil, and a W-phase coil, and are wound around the insulating substrates 112. In the case that the rotating electric machine 12 is a generator, the rotating electric machine 12 is a so-called three-phase power source. The plurality of insulating substrates 112 are arranged in an annular shape. Due to being arranged in this manner, an inner hole is formed in the stator 36.

The stator 36 is accommodated in the accommodation chamber 22. In this instance, the second sub-housing 20 fulfills a role as a stator holder. More specifically, an annular concave portion 114 is formed in the second sub-housing 20. The insulating substrates 112 included in the stator 36 are engaged with the annular concave portion 114. Due to such engagement, the stator 36 is positioned and fixed in place. Furthermore, the cylindrical columnar shaped projecting member 76 enters into a left opening of the inner hole of the stator 36.

The inner wall of the accommodation chamber 22 and the electromagnetic coils 110 are slightly separated away from each other. Due to being separated in this manner, the main housing 16 and the electromagnetic coils 110 are electrically insulated.

A clearance is formed between the outer circumferential wall of the cylindrical columnar shaped projecting member 76 and the insulating substrates 112. A clearance is also formed between the outer walls of the permanent magnets 72 and the inner walls of the electromagnetic coils 110. As will be discussed later, the compressed air, which is a gas, flows through these clearances. Stated otherwise, these clearances make up one part of a compressed air flow passage.

As shown in FIG. 4, the first sub-housing 18 includes an annular convex portion 116 that projects out in an annular shape. The hollow concave portion 118 is formed on an inner side of the annular convex portion 116. The projecting distal end 46, which is one portion of the left end part 422 of the inner shaft 42, enters into the hollow concave portion 118.

The resolver holder 30 is provided on the annular convex portion 116. The resolver holder 30 has a flange shaped stopper 120 that is projected out toward an outer side in the radial direction. The flange shaped stopper 120 is larger in diameter than an inner diameter of the annular convex portion 116. Accordingly, the flange shaped stopper 120 abuts against the annular convex portion 116. Due to abutting in this manner, the resolver holder 30 is positioned. In this state, the resolver holder 30 is connected to the first sub-housing 18, for example, via mounting bolts (not shown).

A small cylindrical portion 122 is provided in the resolver holder 30 on a left side of the flange shaped stopper 120. Further, a large cylindrical portion 124 is provided on a right side of the flange shaped stopper 120. The large cylindrical portion 124 is larger in diameter than the small cylindrical portion 122. A retaining hole 126 is formed in the resolver holder 30. A major portion of a resolver stator 130 is fitted into the retaining hole 126. Due to being fitted therein in this manner, the resolver stator 130 is retained by the resolver holder 30.

At a time when the large cylindrical portion 124 enters into the hollow concave portion 118 and the flange shaped stopper 120 comes into abutment against the annular convex portion 116, the resolver rotor 56 is positioned in the inner hole of the resolver stator 130. The resolver 132 is constituted by the resolver stator 130 and the resolver rotor 56. The resolver 132 serves as the rotational parameter detector. According to the present embodiment, the resolver 132 detects an angle of rotation of the inner shaft 42. Moreover, as noted previously, the resolver rotor 56 is retained by the flange portion 50 on the left end part 422 of the inner shaft 42.

An engagement hole 134 is formed in the flange shaped stopper 120. A transmission connector 136 is engaged with the engagement hole 134. The resolver stator 130 and the transmission connector 136 are electrically connected via a signal line 138. Moreover, a reception connector of a receiver (not shown) is inserted into the transmission connector 136. The resolver 132 and the receiver are electrically connected via the transmission connector 136 and the reception connector. The receiver receives signals emitted by the resolver 132.

A plurality of tab portions 140 (which are omitted from illustration in FIG. 1) are provided on the small cylindrical portion 122. An individual one of the tab portions 140 is shown in FIG. 3. Furthermore, the small cylindrical portion 122 is covered by the cap cover 32. The cap cover 32 closes a left opening of the small cylindrical portion 122, and in addition, shields the left end part 422 of the inner shaft 42. Moreover, it should be noted that the cap cover 32 is connected to the tab portions 140 via connecting bolts 142.

Figure 9:
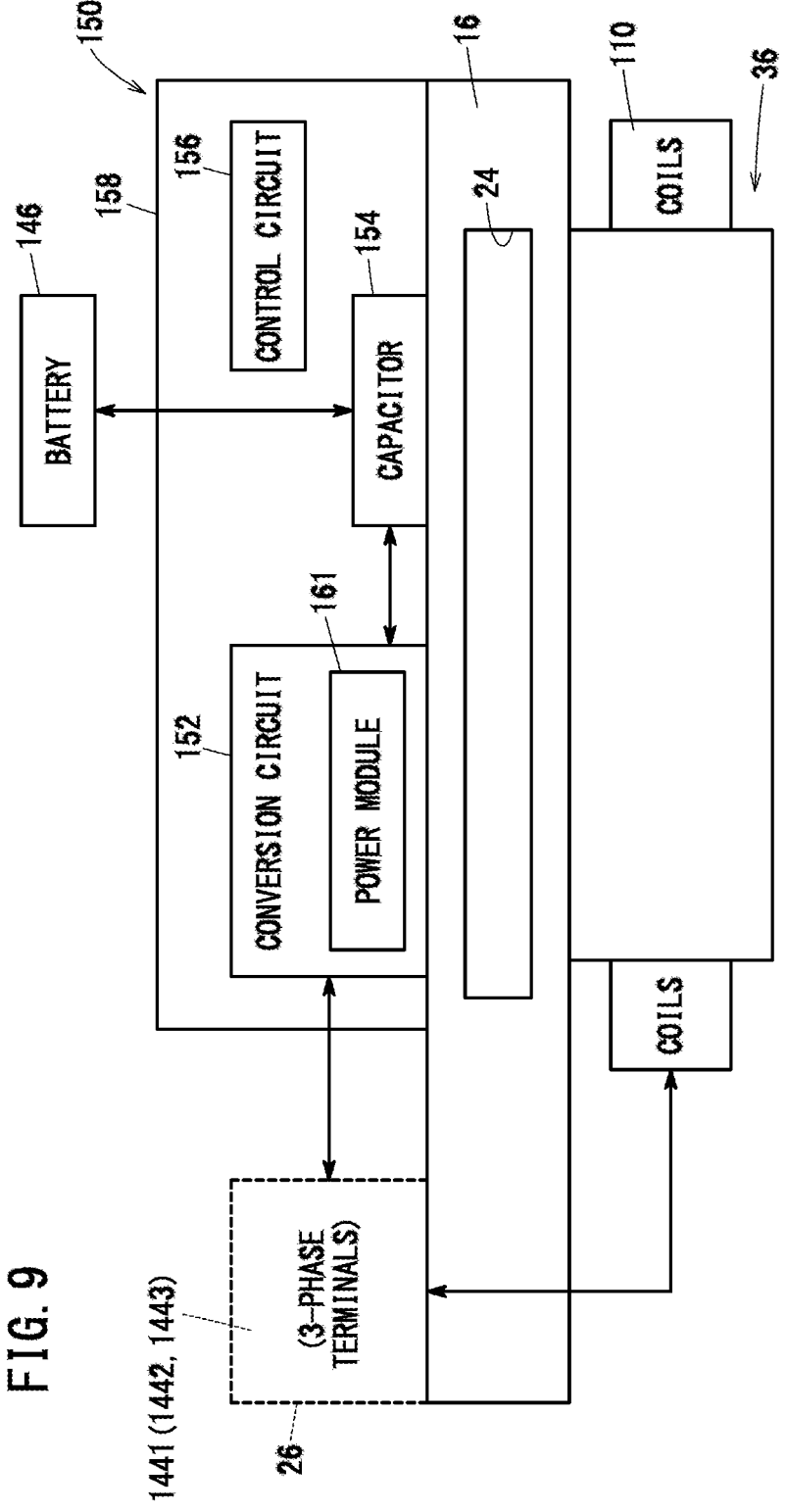
FIG. 9 is a schematic configuration diagram of an electrical current converter provided in a rotating electric machine housing.

As noted previously, the first casing 26 and the second casing 28 are integrally provided on a side wall in proximity to the left end of the main housing 16. A U-phase terminal 1441, a V-phase terminal 1442, and a W-phase terminal 1443 are accommodated in the first casing 26. The U-phase terminal 1441 is electrically connected to a U-phase coil within the electromagnetic coils 110. The V-phase terminal 1442 is electrically connected to a V-phase coil within the electromagnetic coils 110. The W-phase terminal 1443 is electrically connected to a W-phase coil within the electromagnetic coils 110. The U-phase terminal 1441, the V-phase terminal 1442, and the W-phase terminal 1443 are electric terminal portions to which an external device (an external load or an external power source) is electrically connected. Electrical power generated by the rotating electric machine 12 is supplied to the external device. As the external load, for example, there may be cited a non-illustrated motor. Further, as another external device, for example, there may be cited a battery 146 as shown in FIG. 9.

The second casing 28 is adjacent to the first casing 26. A thermistor 148, which serves as a temperature measurement device, is accommodated in the second casing 28. Although not illustrated in particular, measurement terminals of the thermistor 148 are connected to the electromagnetic coils 110 after having been drawn out from the second casing 28. A harness 149 that is connected to the thermistor 148 is drawn out from the second casing 28.

As shown in FIG. 1 and FIG. 2, an electrical current converter 150 is disposed on the outer circumferential wall of the main housing 16. The electrical current converter 150 is located closer to the gas turbine engine 200 than the first casing 26 is. As shown in FIG. 9, the electrical current converter 150 includes a conversion circuit 152, a capacitor 154, and a control circuit 156. The conversion circuit 152, the capacitor 154, and the control circuit 156 are accommodated inside an equipment case 158. The equipment case 158 is arranged, for example, on the outer circumferential wall of the main housing 16 at a location that does not interfere with a first hollow tube portion 1601, a second hollow tube portion 1602, and a third hollow tube portion 1603 (refer to FIG. 1).

The hollow interior portions of the first hollow tube portion 1601, the second hollow tube portion 1602, and the third hollow tube portion 1603 are compressed air flow passages through which the compressed air flows. More specifically, according to the present embodiment, three compressed air flow passages are formed in the rotating electric machine housing 14. The first hollow tube portion 1601 and the third hollow tube portion 1603 are formed as hollow bulging portions that bulge out from the outer circumferential wall of the main housing 16.

The conversion circuit 152 includes a power module 161. The conversion circuit 152 converts an AC current generated by the electromagnetic coils 110 into a DC current. At this time, the capacitor 154 temporarily stores the DC current converted by the conversion circuit 152 as an electric charge. The conversion circuit 152 also possesses a function of converting the DC current delivered from the battery 146 into an AC current. In this case, the capacitor 154 temporarily stores the DC current delivered from the battery 146 toward the electromagnetic coils 110 as an electric charge.

The control circuit 156 controls a current density or the like of the DC current that flows from the capacitor 154 toward the battery 146, or the DC current that flows in the opposite direction. Moreover, the DC current from the battery 146 is supplied to the motor, for example, via an AC-DC converter (neither of which are shown).

In the rotating electric machine system 10 which is configured in the manner described above, a compressed air flow passage, and a lubricating oil flow passage (a first oil supply passage and a second oil supply passage) are formed. First, a description will be given concerning the compressed air flow passage.

Figure 10:
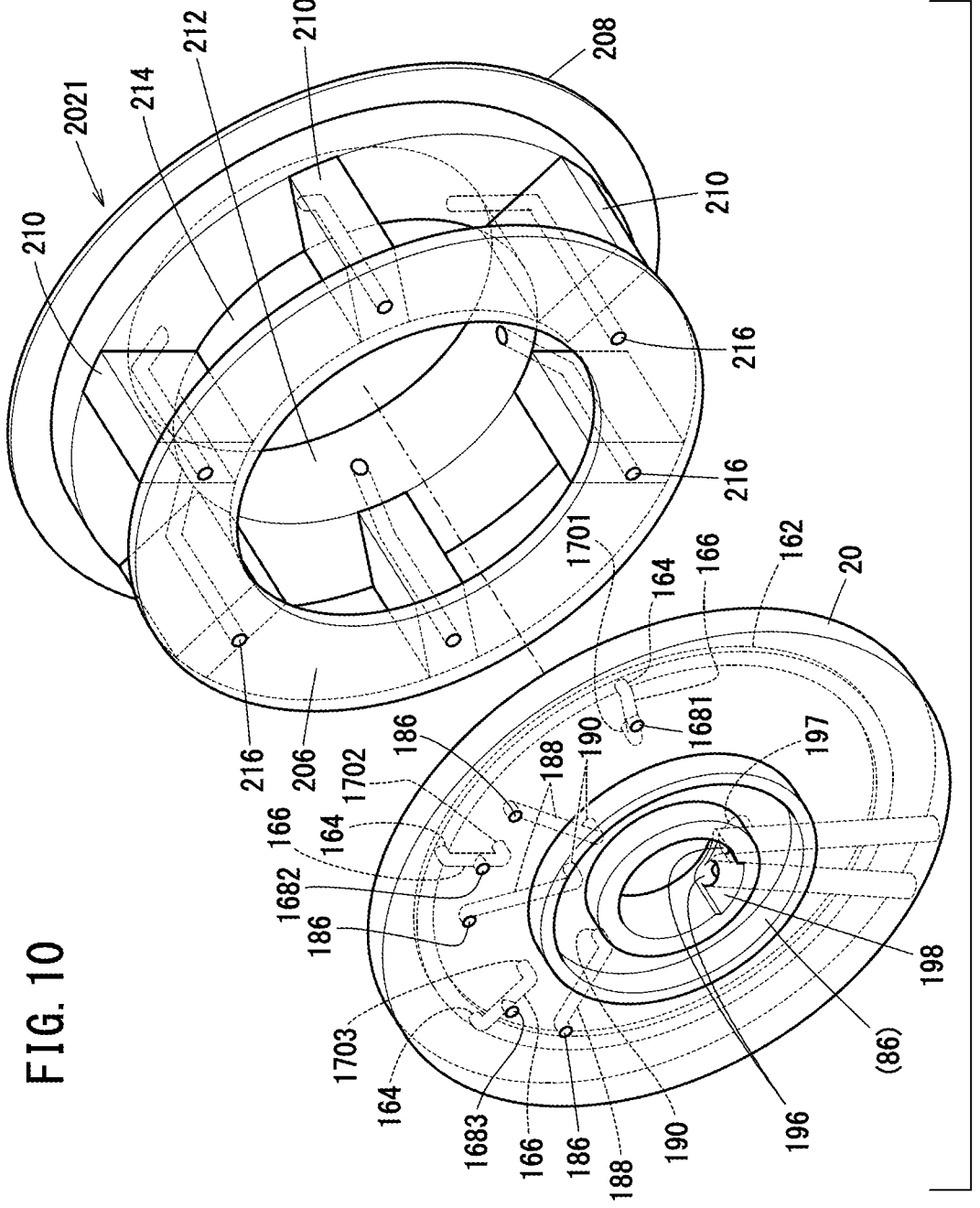
FIG. 10 is a schematic perspective view of a second sub-housing that constitutes part of the rotating electric machine housing, and an inner housing in an engine housing.

As shown in FIG. 10, in the second sub-housing 20, on an end surface thereof facing toward the gas turbine engine 200, an annular shaped collection flow passage 162 made up from an annular concave portion is formed therein. As will be discussed later, a portion of the compressed air generated by the gas turbine engine 200 flows through the collection flow passage 162. Three upstream communication holes 164 are formed in a bottom wall of the collection flow passage 162 (the annular concave portion). The upstream communication holes 164 serve as input ports for the compressed air.

Air relay passages 166 are provided in the interior of the second sub-housing 20. The air relay passages 166 extend radially in a radial direction of the second sub-housing 20. The air relay passages 166 communicate on a radially outward side with the collection flow passage 162 via the upstream communication holes 164. Further, in the second sub-housing 20, three first downstream communication holes 1681 to 1683 are formed in an end surface facing toward the rotating electric machine 12. The first downstream communication holes 1681 to 1683 serve as first output ports of the air relay passages 166. A distribution passage is formed by the collection flow passage 162 and the air relay passages 166.

In the second sub-housing 20, three second downstream communication holes 1701 to 1703 are formed in an end surface facing toward the gas turbine engine 200. The second downstream communication holes 1701 to 1703 serve as second output ports of the air relay passages 166. The second downstream communication holes 1701 to 1703 are positioned more inward in a radial direction than the first downstream communication holes 1681 to 1683. Accordingly, the compressed air that flows through the air relay passages 166 is divided into compressed air that enters into the first downstream communication holes 1681 to 1683, and compressed air that enters into the second downstream communication holes 1701 to 1703.

As shown in FIG. 2, the first hollow tube portion 1601, the second hollow tube portion 1602, and the third hollow tube portion 1603 are provided on the outer surface of the side wall of the main housing 16. The first downstream communication holes 1681 to 1683, respectively, open individually toward the first hollow tube portion 1601 to the third hollow tube portion 1603. As can be understood from this feature, the air relay passages 166 place the collection flow passage 162 in communication with the hollow interiors of the first hollow tube portion 1601 to the third hollow tube portion 1603. As shown in FIG. 3, the first hollow tube portion 1601 to the third hollow tube portion 1603 are positioned radially outward of the cooling jacket 24 that is formed on the side wall interior of the main housing 16.

The first hollow tube portion 1601 to the third hollow tube portion 1603 extend in the axial direction of the main housing 16. More specifically, the first hollow tube portion 1601 to the third hollow tube portion 1603 extend from the second end that faces toward the gas turbine engine 200, and toward the first casing 26 (or the first end). The hollow interior of the first hollow tube portion 1601 communicates with the second internal space of the second casing 28. The hollow interior portions of the second hollow tube portion 1602 and the third hollow tube portion 1603 communicate with the first internal space 29 of the first casing 26.

As will be described later, the compressed air that has flowed through the hollow interior portion of the first hollow tube portion 1601 forms an air curtain in the second internal space of the second casing 28. Thereafter, the compressed air flows into the first internal space 29 of the first casing 26. Curtain air that has flowed through the hollow interior portions of the second hollow tube portion 1602 and the third hollow tube portion 1603 flows into the first internal space 29 of the first casing 26. As can be understood from this feature, the hollow interior portions of the first hollow tube portion 1601 to the third hollow tube portion 1603 are gas supply passages for supplying the compressed air. Further, in the direction through which the compressed air flows, the first casing 26 and the second casing 28 are located more downstream than the first hollow tube portion 1601 to the third hollow tube portion 1603.

As noted previously, the first internal space 29 of the first casing 26 and the second internal space of the second casing 28 communicate with each other through the mutual communication holes. The first internal space 29 of the first casing 26 is in communication with the accommodation chamber 22. Accordingly, the compressed air that has flowed through the first hollow tube portion 1601 to the third hollow tube portion 1603 flows into the accommodation chamber 22 via the first internal space 29 of the first casing 26.

In the present embodiment, although a case is exemplified in which the first hollow tube portion 1601 to the third hollow tube portion 1603 are provided, the number of the hollow tube portions is appropriately determined in accordance with a flow rate or a flow velocity required for the curtain air to be formed from the compressed air. More specifically, the number of the hollow tube portions is not limited to being three. Further, in a similar manner, the cross-sectional area of the hollow tube portions is appropriately determined in accordance with the flow rate or the flow velocity required for the curtain air.

The compressed air that has flowed into the accommodation chamber 22 is thereafter divided into compressed air that is directed toward the first insertion hole 78, and compressed air that is directed toward the second insertion hole 86. Specifically, a portion of the compressed air flows through a clearance between the first sub-housing 18 and the rotor 34 and toward the first insertion hole 78. In this manner, the clearance between the first sub-housing 18 and the rotor 34 forms a first air branching passage L. On the other hand, a remaining portion of the compressed air primarily flows through a clearance between the outer walls of the permanent magnets 72 and the inner walls of the electromagnetic coils 110 and toward the second insertion hole 86. In this manner, the clearance between the outer walls of the permanent magnets 72 and the inner walls of the electromagnetic coils 110 forms a second air branching passage M.

The compressed air that has reached the first air branching passage L forms an air curtain which seals the lubricating oil supplied to the first bearing 74. Further, the compressed air that has reached the third sub-branching passage 941 (the second distal end 861 of the second insertion hole 86) from the second air branching passage M forms an air curtain which seals the lubricating oil supplied to the second bearing 84. In this manner, the compressed air that has flowed into the accommodation chamber 22 functions as the curtain air.

As shown in FIG. 5, the three individual inlets 104 are formed in the base portion 98 of the rectifying member 96. An individual one of the inlets is shown in FIG. 5. An individual one of the inlets 104 connects to the second downstream communication hole 1701 (not shown). Another individual one of the inlets 104 connects to the second downstream communication hole 1702 (not shown). Further, another individual one of the inlets 104 connects to the second downstream communication hole 1703 (not shown). Accordingly, the compressed air output from the second downstream communication holes 1701 to 1703 enters into the relay chamber 106 of the reduced diameter portion 100 of the rectifying member 96 via the inlets 104.

The relay chamber 106 connects to the insertion hole 108 that is formed in the top portion 102. In this instance, the relay chamber 106 becomes wider as it comes closer to the insertion hole 108 and the fourth sub-branching passage 942. Therefore, as the compressed air flows through the relay chamber 106, the pressure of the curtain air decreases.

The outlet of the relay chamber 106 faces toward the small diameter cylindrical portion 242 of the compressor wheel 222. Accordingly, the compressed air that has entered into the relay chamber 106 comes into contact with the small diameter cylindrical portion 242 of the compressor wheel 222. Thereafter, the compressed air is divided into compressed air that is directed toward the fourth sub-branching passage 942, and compressed air that is directed toward the outlet passage 943. As a result, the pressure of the compressed air that flows along the fourth sub-branching passage 942 and toward the second proximal end 862 of the second insertion hole 86 is reduced.

The compressed air that has reached the second proximal end 862 of the second insertion hole 86 from the fourth sub-branching passage 942 forms an air curtain which seals the lubricating oil supplied to the second bearing 84. Further, the compressed air that has flowed into the outlet passage 943 is discharged in an inward direction from a first end (an open end) in a shroud case 220. The compressed air is drawn back again to the compressor wheel 222.

An exhaust passage 172 (a gas exhaust passage) is formed in the main housing 16. The compressed air that has reached the first air branching passage L and the compressed air that has reached the second air branching passage M are discharged to the exterior of the main housing 16 through the exhaust passage 172.

Figure 11:
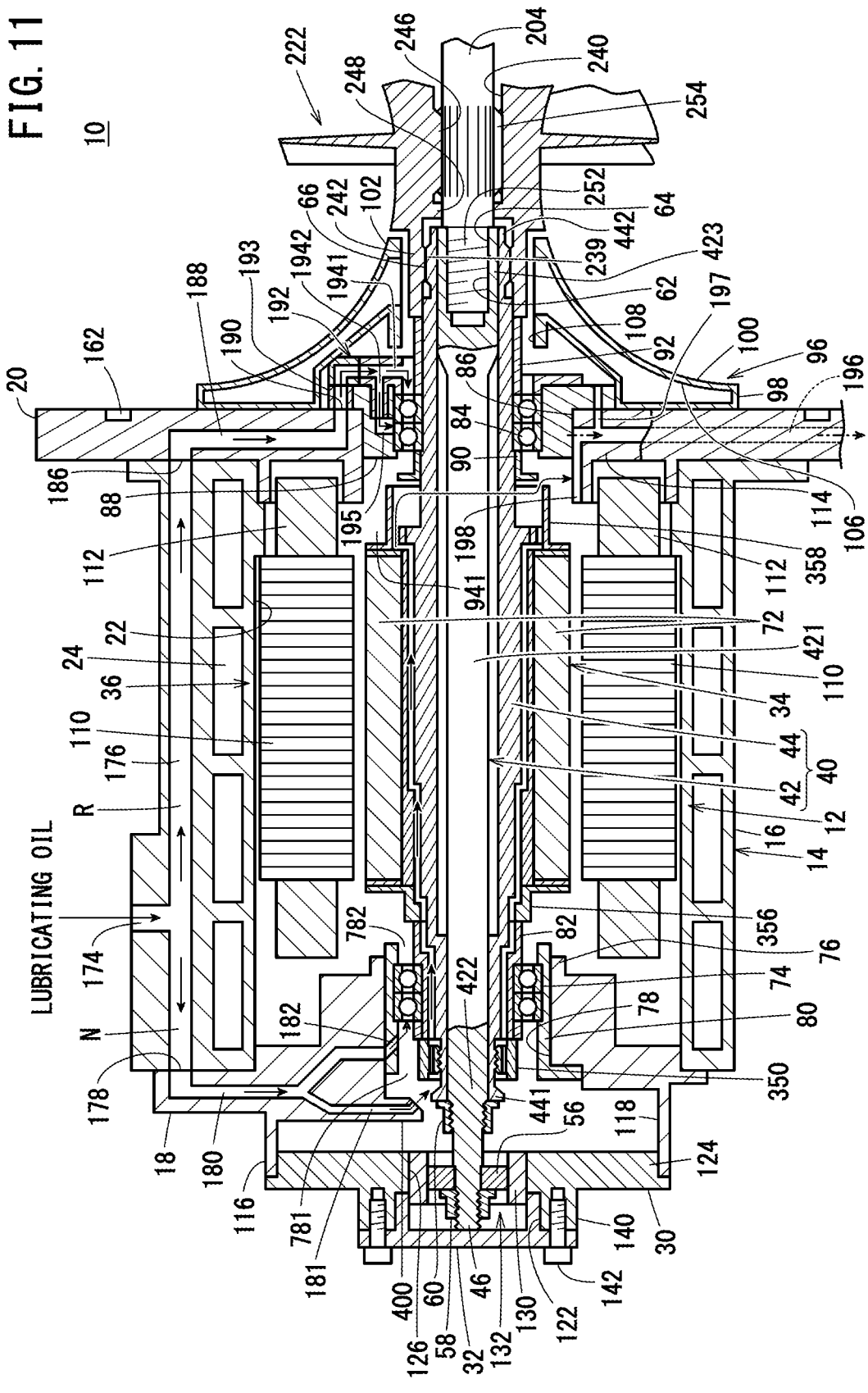
FIG. 11 is a schematic cross-sectional side view of the rotating electric machine system in a phase that differs from the phase shown in FIG. 3.

Next, a description will be given concerning the lubricating oil flow passage. FIG. 11 is a schematic side cross-sectional view of the rotating electric machine system 10. Moreover, in FIG. 11, a phase is shown that differs from the phase shown in FIG. 3.

An input passage 174 in order to supply the lubricating oil is formed in the side wall of the main housing 16. The input passage 174 is formed at a position closer to the first end than a center in the axial direction of the main housing 16. The input passage 174 extends in the radial direction of the main housing 16, and communicates with a main oil passage 176. The main oil passage 176 is formed on the outer circumference of the cooling jacket 24, and extends in the axial direction of the main housing 16. At a border with a connecting location with the input passage 174, the main oil passage 176 branches into a first oil branching passage N directed toward the first sub-housing 18, and a second oil branching passage R directed toward the second sub-housing 20.

In the first sub-housing 18, a first inflow hole 178 is formed at a location in facing relation to the first oil branching passage N. Furthermore, in the interior of the first sub-housing 18, a first auxiliary oil passage 180 (a first oil supply passage), which faces toward a radially inward direction of the first sub-housing 18, is formed. The first auxiliary oil passage 180 bends at two locations until reaching the first bearing holder 80.

The second auxiliary oil passage 181 (the second oil supply passage) branches off from the first auxiliary oil passage 180. In this instance, as shown in FIG. 7, FIG. 8, and FIG. 11, the first sub-housing 18 includes a protruding end part 400 that projects out toward the oil guiding member 350. A distal end of the second auxiliary oil passage 181 extends to the interior of the protruding end part 400. The outlet of the second auxiliary oil passage 181 is slightly curved. The outlet of the second auxiliary oil passage 181 is a nozzle 181a that discharges the lubricating oil toward the annular gap 385 of the rotor 34. In accordance with this feature, the second auxiliary oil passage 181 supplies the lubricating oil toward the annular gap 385.

A first oil supply hole 182 that communicates with the first auxiliary oil passage 180 is formed in the first bearing holder 80. An outlet of the first oil supply hole 182 is formed at the first distal end 781 of the first insertion hole 78. Accordingly, the lubricating oil that flows from the main oil passage 176 into the first auxiliary oil passage 180 flows from the first oil supply hole 182 through the first distal end 781 of the first insertion hole 78, and comes into contact with the first bearing 74.

As shown in FIG. 3, a first drain passage 184 is formed in the first sub-housing 18. The first drain passage 184 discharges the lubricating oil that has come into contact with the first bearing 74 from the hollow concave portion 118 formed by the annular convex portion 116 of the first sub-housing 18, and the resolver holder 30. In this manner, the first drain passage 184 serves as an oil discharge passage for the purpose of discharging the lubricating oil to the exterior of the rotating electric machine housing 14. Further, the first drain passage 184 serves as a first oil pathway that guides the lubricating oil to a gas-liquid separation device 302 (to be described later).

Three individual ones of the first oil branch passages N, three individual ones of the first inflow holes 178, three individual ones of the first auxiliary oil passages 180, and three individual ones of the first oil supply holes 182 are formed. Similarly, three individual ones of the second oil branching passages R are formed. In FIG. 11, an individual one of each of the first oil branching passages N, the first inflow holes 178, the first auxiliary oil passages 180, the first oil supply holes 182, and the second oil branching passages R are shown.

As noted previously, the outlet of the second auxiliary oil passage 181 is slightly curved. In accordance with this feature, the outlet of the second auxiliary oil passage 181 faces toward a gap between the annular projecting member 380 of the oil guiding member 350, and the outer surface of the first shaft portion 44a in the outer shaft 44. Accordingly, one portion of the lubricating oil, which was diverted from the first auxiliary oil passage 180 into the second auxiliary oil passage 181, is supplied from the outlet of the second auxiliary oil passage 181 toward the oil receiving concave portion 340. The lubricating oil moves from the inclined surface 342 of the oil receiving concave portion 340 toward the annular gap 385 formed between the rotating shaft 40 and the oil guiding member 350. The lubricating oil which has entered into the annular gap 385 passes through the annular groove 384 and the first oil delivery passages 386, and flows therethrough in order of the flow through space 374, the flow through space 360, the flow through space 353, the second oil delivery passages 3582, and the flow through space 362. More specifically, the lubricating oil flows through the rotor internal oil passage 354.

An opening of the hole portion of the second magnet stopper 358 (the outlet of the rotor internal oil passage 354) is covered by the disk portion 392 of the second inner stopper 90. Therefore, the lubricating oil that has flowed out from the rotor internal oil passage 354 comes into contact with the disk portion 392. Due to coming into contact therewith, a situation is avoided in which the lubricating oil flows toward the second bearing 84.

As shown in FIG. 10, a first drain hole 198, a second drain hole 197, and a second drain passage 196 are formed in the second sub-housing 20. The lubricating oil, which has flowed out from the rotor internal oil passage 354 and come into contact with the disk portion 392, passes through the first drain hole 198 and flows into the second drain passage 196. On the other hand, the lubricating oil, which has come into contact with the second bearing 84, passes through the second drain hole 197 and flows into the second drain passage 196. In this manner, the second drain passage 196 serves as a second oil pathway that guides the lubricating oil to the gas-liquid separation device 302 (to be described later). Further, the first drain hole 198, the second drain hole 197, and the second drain passage 196 serve as an oil discharge passage for the purpose of discharging the lubricating oil to the exterior of the rotating electric machine housing 14.

As shown in FIG. 10, in the second sub-housing 20, three individual oil receiving holes 186 open on an end surface facing toward the rotating electric machine system 10. The oil receiving holes 186 are closer to the outer side in the radial direction than the first downstream communication holes 1681 to 1683 are. The oil receiving holes 186 serve as inlets for the lubricating oil.

Three individual third auxiliary oil passages 188 are provided in the interior of the second sub-housing 20. The third auxiliary oil passages 188 extend radially in a radial direction of the second sub-housing 20. However, the third auxiliary oil passages 188 are formed at a phase that differs from the phase of the air relay passages 166. Further, in the second sub-housing 20, three individual oil outflow holes 190 are formed in an end surface facing toward the gas turbine engine 200. Hollow pin portions 193 of an oil distributor 192 are fitted into the oil outflow holes 190.

A first guide passage 1941 and a second guide passage 1942 are formed in the interior of the oil distributor 192. The lubricating oil that has passed through the third auxiliary oil passages 188 is divided into lubricating oil that flows through the first guide passage 1941, and lubricating oil that flows through the second guide passage 1942. The outlet of the first guide passage 1941 is positioned at the second proximal end 862 of the second insertion hole 86. Accordingly, the lubricating oil that has flowed out from the first guide passage 1941 comes into contact with the second bearing 84 from the second proximal end 862. The aforementioned feature forms another part of the first oil supply passage.

The second guide passage 1942 branches off from midway along the first guide passage 1941. A second oil supply hole 195, which is formed in the second bearing holder 88, continues to the outlet of the second guide passage 1942. Accordingly, the lubricating oil that has passed through the second guide passage 1942 flows out from the second oil supply hole 195 and comes into contact with the second bearing 84.

As shown in FIG. 11, a space formed by the rectifying member 96 and the second outer stopper 92 communicates with the second drain passage 196 via the second drain hole 197. Accordingly, the lubricating oil, which has entered into the space, passes through the second drain hole 197 and flows into the second drain passage 196.

Figure 12:
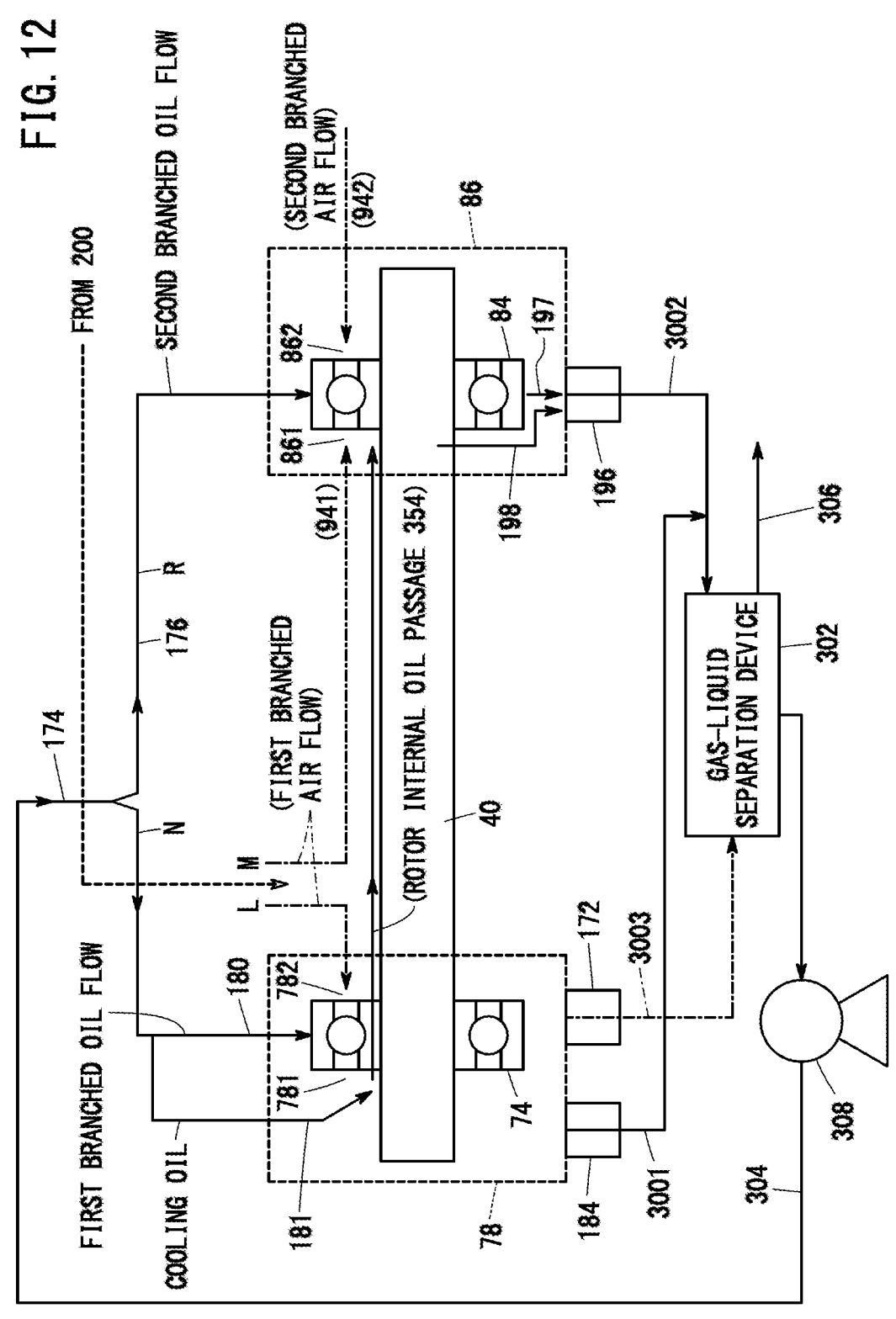
FIG. 12 is a schematic system diagram schematically showing a lubricating oil flow passage (a second supply passage) in the rotating electric machine system.

As shown in FIG. 12, the first drain passage 184 is connected via a first relay pipe 3001 to the gas-liquid separation device 302. The second drain passage 196 is connected via a second relay pipe 3002 to the gas-liquid separation device 302. The exhaust passage 172 is connected via a third relay pipe 3003 to the gas-liquid separation device 302. More specifically, the compressed air and the lubricating oil that have flowed through the interior of the rotating electric machine housing 14 are collected in the gas-liquid separation device 302. In this manner, the gas-liquid separation device 302 is a recovery device for recovering the lubricating oil and the compressed air, and further, constitutes an oil circulation supply device. A circulation supply line 304 (a circulation passage) and a discharge line 306 (a discharge passage) are provided in the gas-liquid separation device 302. A circulation pump 308 that constitutes part of the oil circulation supply device is provided in the circulation supply line 304.

As will be discussed later, the compressed air is contained in the lubricating oil that has flowed out from the first drain passage 184 and the second drain passage 196. Stated otherwise, the lubricating oil flowing into the gas-liquid separation device 302 is a gas-liquid mixture. In the gas-liquid separation device 302, the gas-liquid mixture is separated into the lubricating oil and air. The lubricating oil is discharged from the gas-liquid separation device 302 by the circulation pump 308, passes through the circulation supply line 304, and is resupplied to the input passage 174. On the other hand, the air is released to the atmosphere via the discharge line 306.

Figure 13:
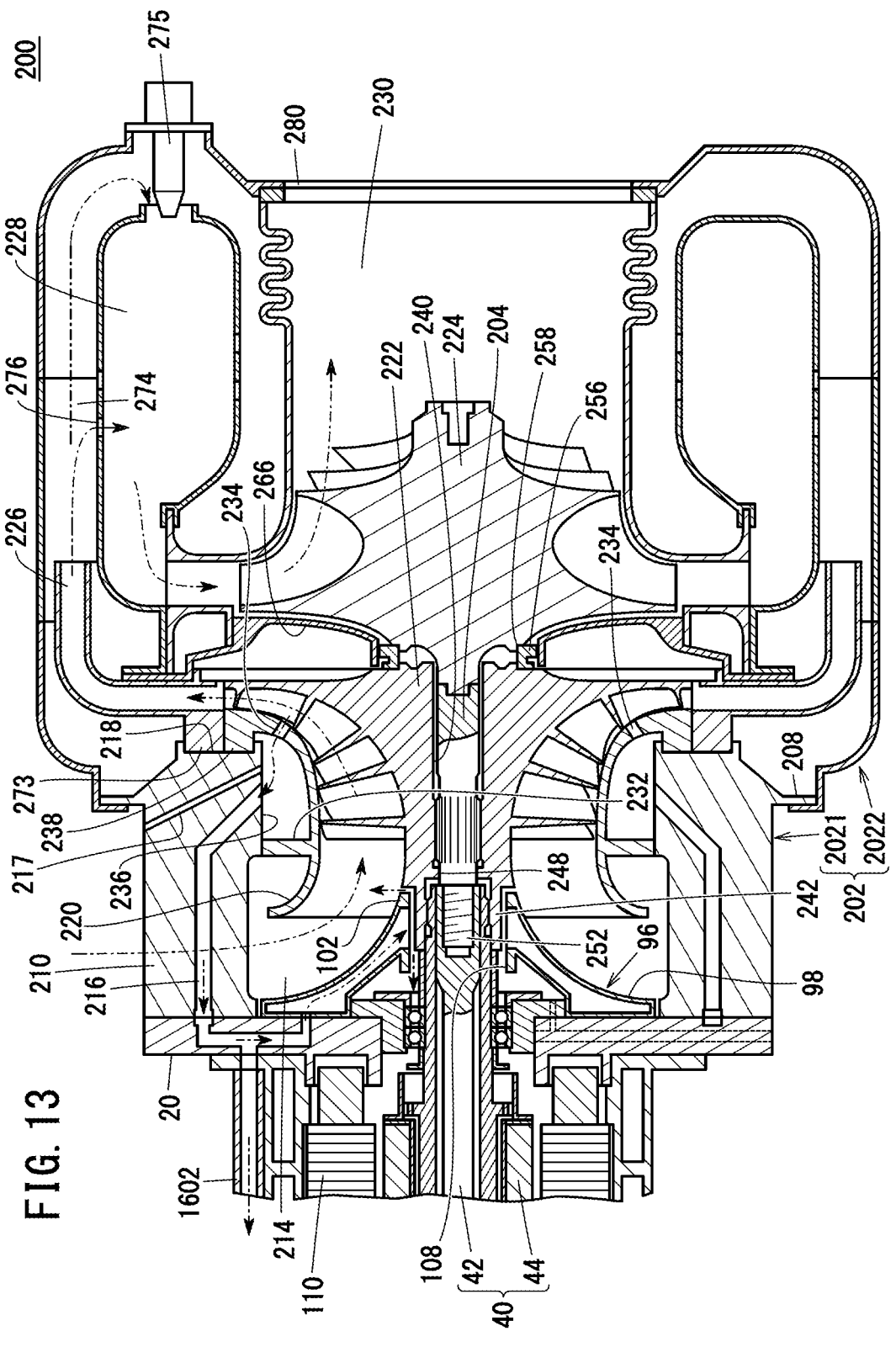
FIG. 13 is a schematic side cross-sectional view of a gas turbine engine constituting part of the combined power system.

Next, a description will be given concerning the gas turbine engine 200. As shown in FIG. 13, the gas turbine engine 200 comprises an engine housing 202, and the output shaft 204 that rotates inside the engine housing 202. The engine housing 202 includes an inner housing 2021 and an outer housing 2022. The inner housing 2021 is connected to the second sub-housing 20 of the rotating electric machine system 10. The outer housing 2022 is connected to the inner housing 2021. The outer housing 2022 forms a housing main body.

As shown in FIG. 1 and FIG. 10, the inner housing 2021 includes a first annular portion 206, a second annular portion 208, and a plurality of individual leg members 210. The first annular portion 206 is connected to the second sub-housing 20. The diameter of the second annular portion 208 is greater than the diameter of the first annular portion 206. The leg members 210 connect the first annular portion 206 and the second annular portion 208. In the illustrated example, the number of the leg members 210 is six. However, the number of the leg members 210 is determined in accordance with the necessary coupling strength required between the gas turbine engine 200 and the rotating electric machine system 10. Stated otherwise, the number of the leg members 210 is not limited to being six as in the illustrated example.

A cylindrically shaped cover member 212 projects out toward the rotating electric machine system 10 from a central opening of the second annular portion 208. Right ends of the leg members 210 continue to both sides of the cylindrically shaped cover member 212. An air intake space 214 is formed between the leg members 210.

As shown in FIG. 10 and FIG. 13, air bleed passages 216 are individually formed in the interior of the six individual leg members 210. In the leg members 210, inlets of the air bleed passages 216 are individually formed at connected locations thereof with the cylindrically shaped cover member 212. In the first annular portion 206, outlets of the air bleed passages 216 are individually formed on the end surface facing toward the second sub-housing 20. All of the outlets of the air bleed passages 216 are positioned on the circumference of a virtual circle. Accordingly, all of the outlets of the air bleed passages 216 are superimposed on the collection flow passage 162 which is formed in an annular shape. More specifically, all of the plurality of air bleed passages 216 are in communication with the collection flow passage 162. In this manner, the compressed air from the plurality of air bleed passages 216 flows in and is gathered in the collection flow passage 162.

Air vent holes 217 are formed in the leg members 210. The air vent holes 217 extend linearly from an inner wall to an outer wall of the cylindrically shaped cover member 212. The air vent holes 217 are also capable of extending from an inner wall of the cylindrically shaped cover member 212 to the outer walls of the leg members 210. The number of the air vent holes 217 may be one individual air vent hole or a plurality of individual air vent holes. Further, formation of the air vent holes 217 is not strictly essential.

As shown in FIG. 13, an annular shaped engaging concave portion 218 is formed on a right end surface of the second annular portion 208. The shroud case 220 and a diffuser 226 are positioned and fixed in place by the engaging concave portion 218 (to be described later).

As shown in FIG. 13, the gas turbine engine 200 is further equipped with the shroud case 220, the compressor wheel 222, the turbine wheel 224, the diffuser 226, a combustor 228, and a nozzle 230.

The shroud case 220 is a hollow body, and is of a larger scale than the rectifying member 96. A small diameter left end of the shroud case 220 faces toward the rectifying member 96. A large diameter right end of the shroud case 220 is inserted into the cylindrically shaped cover member 212 in the inner housing 2021. The shroud case 220 gradually decreases in diameter from the right end toward the left end, however, the distal end of the left end thereof is curved so as to expand toward an outer side in the radial direction.

The left end of the shroud case 220 is exposed to the air intake space 214. The top portion 102 of the rectifying member 96 enters into the interior of the shroud case 220 at the left end thereof. An annular shaped closing flange portion 232 is provided on a curved side circumferential wall in the shroud case 220. An outer edge of the closing flange portion 232 abuts against the inner walls of the cylindrically shaped cover member 212 and the leg members 210.

In the side wall of the shroud case 220, an air bleed port 234 is formed between the closing flange portion 232 and a first engaging convex portion 238. The air bleed port 234 extends from the inner surface to the outer surface of the side wall of the shroud case 220. The air bleed port 234 serves as an inlet to a chamber 236 when the compressed air enters into the chamber 236.

The chamber 236 is interposed between the air bleed port 234 and the air bleed passages 216. More specifically, the chamber 236 allows the air bleed port 234 and the air bleed passages 216 to communicate with each other. Further, the chamber 236 is open to the atmosphere through the air vent holes 217.

From the right end of the shroud case 220, the first engaging convex portion 238 projects out toward the second annular portion 208. The first engaging convex portion 238 engages with the engaging concave portion 218 of the second annular portion 208. Due to such engagement and the outer edge of the closing flange portion 232 coming into abutment against the inner walls of the cylindrically shaped cover member 212 and the leg members 210, the shroud case 220 is positioned and fixed in place in the inner housing 2021. Simultaneously, the chamber 236 is formed, which is surrounded by the leg members 210, the cylindrically shaped cover member 212, the second annular portion 208, and the closing flange portion 232, the side circumferential wall, and the first engaging convex portion 238 of the shroud case 220. The chamber 236 exhibits an annular shape which surrounds the shroud case 220.

The compressor wheel 222 and the turbine wheel 224 are capable of rotating integrally together with the rotating shaft 40 and the output shaft 204. More specifically, as shown in detail in FIG. 5, the compressor wheel 222 includes the small diameter cylindrical portion 242 at the left end thereof. The small diameter cylindrical portion 242 enters into the insertion hole 108 that is formed in the rectifying member 96. A first outer spline 239 is formed on the inner wall of the small diameter cylindrical portion 242. The first outer spline 239 is enmeshed with the first inner spline 66 formed on the right open end 442 of the outer shaft 44.

The right open end 442 of the outer shaft 44 is press-fitted into a hollow interior of the small diameter cylindrical portion 242. Therefore, the inner circumferential wall of the left opening of the small diameter cylindrical portion 242 presses the outer circumferential wall of the right open end 442 of the outer shaft 44 radially inward. Due to the enmeshment and press-fitting described above, the compressor wheel 222 is connected to the outer shaft 44 (the rotating shaft 40).

A through hole 240 that extends in the left-right direction is formed in a diametrical center of the compressor wheel 222. In the through hole 240, a second outer spline 246 is engraved into the inner wall of the left end thereof. Further, in the through hole 240, a hole diameter of a location contiguous with the hollow interior of the small diameter cylindrical portion 242 is slightly smaller than that of other locations. Therefore, in the compressor wheel 222, an inner flange portion 248 is provided in proximity to an opening on the side of the small diameter cylindrical portion 242 of the through hole 240. At the portion where the inner flange portion 248 is provided, the hole diameter (diameter) of the through hole 240 is smallest.

The output shaft 204 provided on the turbine wheel 224 is inserted into the through hole 240. The distal end of the left end of the output shaft 204 extends out substantially to the same position as the distal end of the left end of the small diameter cylindrical portion 242 of the compressor wheel 222. As noted previously, the outer circumferential wall of the right open end 442 of the outer shaft 44 is press-fitted into the hollow interior of the small diameter cylindrical portion 242. Therefore, the left end of the output shaft 204, which is projected out from the through hole 240, enters into the connecting hole 62 of the rotating shaft 40. A male threaded portion 252 is engraved on the left end of the output shaft 204. The male threaded portion 252 is screw-engaged with the female threaded portion 64 that is formed on the inner wall of the connecting hole 62. Due to such screw-engagement, the rotating shaft 40 and the output shaft 204 are connected.

A second inner spline 254 is formed in proximity to the left end of the output shaft 204. The second inner spline 254 is enmeshed with the second outer spline 246 formed on the inner circumferential wall of the through hole 240. Further, a left end part of the output shaft 204 is press-fitted into the inner flange portion 248.

As shown in FIG. 13, a ring member 256 is interposed between the compressor wheel 222 and the turbine wheel 224. The ring member 256, for example, is made up from a heat resistant metal material such as a nickel-based alloy or the like.

Figure 14:
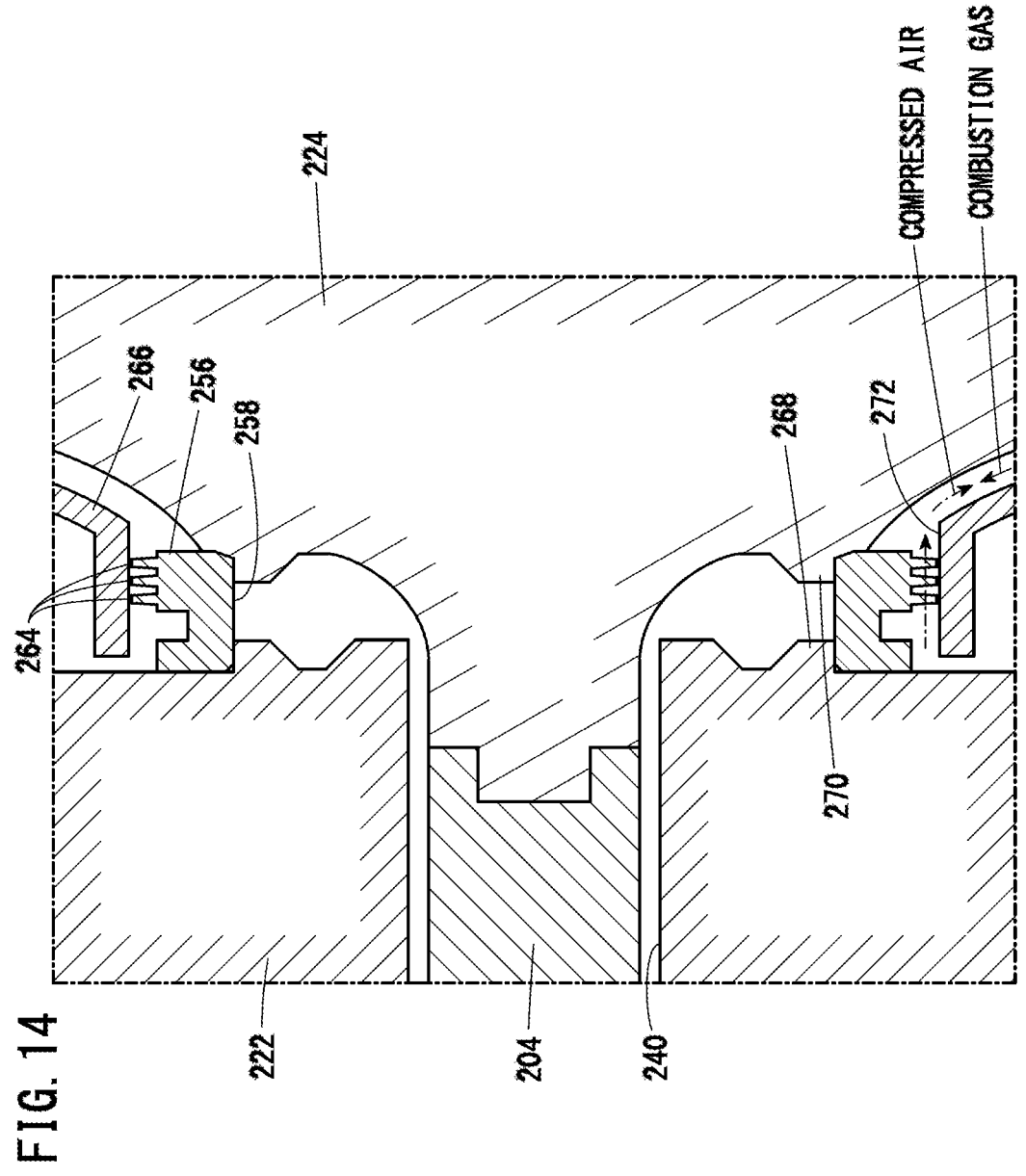
FIG. 14 is an enlarged view of principal components shown in FIG. 13.

As shown in FIG. 14, the ring member 256 is formed with a fitting hole 258 therein that extends from the compressor wheel 222 toward the turbine wheel 224. Further, a plurality of (for example, three) labyrinth forming convex portions 264 are formed on the outer circumferential wall of the ring member 256. The labyrinth forming convex portions 264 project outward in the radial direction of the ring member 256, and in addition, extend in the circumferential direction of the outer circumferential wall. As will be discussed later, the labyrinth forming convex portions 264 prevent a combusted fuel (an exhaust gas) generated in the combustor 228 from flowing back into the compressor wheel 222.

In the compressor wheel 222, an annular shaped projecting member 268 projects out from the right end surface that faces toward the turbine wheel 224. At a time when a left end surface of the ring member 256 is seated on a right end surface of the compressor wheel 222, the annular shaped projecting member 268 is fitted into the fitting hole 258. On the other hand, in the turbine wheel 224, the output shaft 204 extends out from a left end surface thereof that faces toward the compressor wheel 222. Further, a fitting convex portion 270 surrounding the output shaft 204 is formed to project out on the left end surface. At a time when a right end surface of the ring member 256 is seated on the left end surface of the turbine wheel 224, the top surface of the fitting convex portion 270 is fitted into the fitting hole 258. In accordance with the foregoing, the respective parts of the compressor wheel 222 and the turbine wheel 224 are fitted into the fitting hole 258. In such a state, the ring member 256 is sandwiched between the compressor wheel 222 and the turbine wheel 224.

The labyrinth forming convex portions 264 are surrounded by an intermediate plate 266 in the hollow interior of the outer housing 2022 (refer to FIG. 13). The labyrinth forming convex portions 264 are inserted into a hole portion 272 that is formed in the intermediate plate 266. A labyrinth flow passage is formed by the inner wall of the hole portion 272 and the labyrinth forming convex portions 264 that abut against the inner wall. Compressed air generated by the compressor wheel 222 reaches the labyrinth forming convex portions 264 via a rear surface of the compressor wheel 222. On the other hand, the combustion gas reaches the labyrinth forming convex portions 264 from the turbine wheel 224. Since the pressure of the compressed air is higher in comparison with the pressure of the combustion gas, it is possible to prevent the combustion gas from passing through the labyrinth forming convex portions 264 and flowing into the space surrounding the compressor wheel 222.

As shown in FIG. 13, within the hollow interior of the outer housing 2022, respective portions of the shroud case 220 and the compressor wheel 222, as well as the intermediate plate 266 are surrounded by the diffuser 226. A second engaging convex portion 273 is formed on the left end of the diffuser 226. The second engaging convex portion 273 is engaged with the engaging concave portion 218 together with the first engaging convex portion 238 of the shroud case 220. Due to such engagement, the diffuser 226 is positioned and fixed in place in the inner housing 2021.

Within the hollow interior of the outer housing 2022, the turbine wheel 224 is surrounded by the nozzle 230, and further, the nozzle 230 is surrounded by the combustor 228. An annular shaped combustion air flow passage 274 is formed between the combustor 228 and the outer housing 2022. The combustion air flow passage 274 is a passage through which the combustion air flows. A fuel supply nozzle 275 is positioned and fixed to a right end surface of the outer housing 2022. The fuel supply nozzle 275 supplies fuel to the combustor 228.

Relay holes 276 in order to place the combustion air flow passage 274 and the interior of the combustor 228 in communication with each other are formed in the combustor 228. As will be discussed later, the combustion air that is compressed by the compressor wheel 222 reaches the interior of the combustor 228 via the diffuser 226, the combustion air flow passage 274, and the relay holes 276. Non-illustrated fine holes are also formed in the combustor 228. Air discharged from the fine holes forms an air curtain that serves to cool the interior of the combustor 228.

The nozzle 230 includes a portion that surrounds the largest diameter portion of the turbine wheel 224. A non-illustrated delivery hole is formed in this portion for the purpose of supplying the fuel, which has undergone combustion together with the combustion air, to the turbine wheel 224. Moreover, it should be noted that, hereinafter, the fuel that has undergone combustion may also be referred to as a "combusted fuel". The term "combusted fuel" is synonymous with the term "combustion gas" or the "exhaust gas after combustion".

An exhaust port 280 opens at the right end of the outer housing 2022 and the nozzle 230. After having traveled through the delivery hole and into the nozzle 230, by the rotating turbine wheel 224, the combusted fuel is blown out to the exterior of the outer housing 2022 through the exhaust port 280. Moreover, although not shown in particular, an exhaust pipe through which the combusted fuel is discharged is provided in the exhaust port 280.

The combined power system 500 according to the present embodiment is basically configured in the manner described above. Next, a description will be given concerning the advantageous effects of the combined power system 500.

Initially, a DC current is supplied from the battery 146. The conversion circuit 152 of the electrical current converter 150 shown in FIG. 2 and FIG. 9 converts such a DC current into an AC current. The AC current is supplied to the electromagnetic coils 110 (the U-phase coil, the V-phase coil, and the W-phase coil) via the U-phase terminal 1441, the V-phase terminal 1442, and the W-phase terminal 1443. By the AC current flowing through the electromagnetic coils 110, an alternating magnetic field is generated in the stator 36. Therefore, an attractive force and a repulsive force act alternately between the electromagnetic coils 110 and the permanent magnets 72 of the rotor 34. As a result, the rotating shaft 40 begins to rotate. Alternatively, the rotating shaft 40 may be rotated by a well-known type of starter (not shown).

In this instance, as shown in FIG. 5, the first inner spline 66 is formed on the outer circumferential wall of the right open end 442 of the outer shaft 44, and the first outer spline 239 is formed on the inner wall of the small diameter cylindrical portion 242 of the compressor wheel 222. The first inner spline 66 and the first outer spline 239 enmesh with one another. Further, the second inner spline 254 is formed on the output shaft 204, and the second outer spline 246 is formed on the inner wall of the through hole 240 of the compressor wheel 222. The second inner spline 254 and the second outer spline 246 enmesh with one another. Therefore, a rotational torque of the rotating shaft 40 is rapidly transmitted to the output shaft 204 via the compressor wheel 222.

More specifically, when the rotating shaft 40 begins to rotate, the output shaft 204 also starts rotating integrally together with the rotating shaft 40. Along therewith, the compressor wheel 222 and the turbine wheel 224, which are supported by the output shaft 204, rotate integrally together with the output shaft 204. In the foregoing manner, by the first inner spline 66 and the first outer spline 239 being enmeshed, and by the second inner spline 254 and the second outer spline 246 being enmeshed, the rotational torque of the rotating shaft 40 can be sufficiently transmitted to the output shaft 204.

In addition, the right end part of the rotating shaft 40 is press-fitted into the hollow interior of the small diameter cylindrical portion 242 of the compressor wheel 222. Further, the left end part of the output shaft 204 is press-fitted into the inner flange portion 248 of the compressor wheel 222. Therefore, the axis of the rotating shaft 40 and the axis of the output shaft 204 coincide precisely. In accordance with this feature, the output shaft 204 is sufficiently prevented from rotating in an eccentric manner, or rotating while being subjected to vibrations.

Additionally, as shown in FIG. 14, the ring member 256 is interposed between the compressor wheel 222 and the turbine wheel 224. The annular shaped projecting member 268 on the right end surface of the compressor wheel 222, and the fitting convex portion 270 on the left end surface of the turbine wheel 224 are fitted into the fitting hole 258 of the ring member 256. These fittings also contribute to suppressing eccentric rotation (vibration) of the output shaft 204. Accordingly, there is no need to provide a mechanism for suppressing vibration. Further, there is no need to increase the diameter of the output shaft 204. Consequently, it is possible to reduce the size and scale of the combined power system 500.

Furthermore, a frictional force is generated between the right end surface of the compressor wheel 222 and the left end surface of the ring member 256. A frictional force is also generated between the right end surface of the ring member 256 and the left end surface of the turbine wheel 224. Due to such frictional forces, the compressor wheel 222, the ring member 256, and the turbine wheel 224 are kept in close contact with each other. Accordingly, a situation is avoided in which both of the wheels 222 and 224 give rise to rotational misalignment.

Further still, when the combined power system 500 is assembled, due to the above-described fitting, the compressor wheel 222 and the turbine wheel 224 are positioned (centered) with respect to the output shaft 204. In this manner, preferably, the ring member 256 is disposed between both of the wheels 222 and 224, and both of the wheels 222 and 224 are partially fitted individually into the fitting hole 258 of the ring member 256. In accordance with this feature, it becomes easy to center the compressor wheel 222 and the turbine wheel 224 with respect to the output shaft 204.

Due to the above-described rotation, as shown in FIG. 13, atmospheric air is drawn into the shroud case 220 through the air intake space 214 formed between the leg members 210 of the inner housing 2021. In this instance, the rectifying member 96 is positioned at the diametrical center of the inner housing 2021. As noted previously, the rectifying member 96 exhibits a mountain (chevron) shape that becomes smaller in diameter following along the shroud case 220. In addition, the surface of the reduced diameter portion 100 is smooth. Therefore, the atmospheric air that is drawn in is rectified by the rectifying member 96 in a manner so as to flow toward the shroud case 220. Since the right end of the rectifying member 96 enters from the left end opening of the shroud case 220, the atmospheric air is efficiently introduced into the shroud case 220. In this manner, by the rectifying member 96 being shaped in the manner described above, and in addition, by the top portion 102 being made to enter into the shroud case 220, the atmospheric air can be efficiently collected by the shroud case 220.

The atmospheric air that is drawn into the shroud case 220 flows between the compressor wheel 222 and the shroud case 220. From the fact that, in comparison with the left opening of the shroud case 220, the space between the compressor wheel 222 and the shroud case 220 is sufficiently narrow, when flowing therethrough, the atmospheric air is compressed. Stated otherwise, the compressed air is generated.

The air bleed port 234 is formed in the shroud case 220. Therefore, a portion of the compressed air flows into the chamber 236 from the air bleed port 234. Stated otherwise, the compressed air is diverted. The chamber 236 is formed in an annular shape, and includes a larger volume in comparison with the volume of the air bleed port 234. Therefore, the compressed air that has flowed into the chamber 236 is temporarily accumulated and retained in the chamber 236.

From the fact that the plurality of individual air bleed passages 216 are formed, the compressed air is distributed from the chamber 236 to each of the air bleed passages 216. In this case, the curtain air itself that is distributed may differ in pressure. However, according to the present embodiment, the compressed air (the curtain air) that has passed through the air bleed port 234 flows into the single individual chamber 236 that is formed in an annular shape. Consequently, the pressure of the curtain air inside the chamber 236 is uniform. Stated otherwise, the pressure of the curtain air is equalized. In this manner, the chamber 236 serves as a pressure regulation chamber that regulates the pressure of the curtain air to be substantially constant.

The curtain air that has flowed in from the air bleed port 234, as has been discussed previously, makes up a portion of the compressed air, and is high in pressure. In this instance, since the volume of the chamber 236 is larger than the volume of the air bleed port 234, the curtain air spreads out as it flows into the chamber 236. Therefore, the pressure of the curtain air is lowered. As can be understood from this feature, the chamber 236 also serves in a dual manner as a buffer chamber that causes the pressure of the compressed air to be reduced.

In addition to the air bleed passages 216, the air vent holes 217 are formed in the inner housing 2021. Compressed air that excessively flows thereinto is released to the exterior (the atmosphere) of the gas turbine engine 200 through the air vent holes 217. Therefore, an excessive rise in the pressure of the curtain air inside the chamber 236 is avoided. More specifically, due to the air vent holes 217, the pressure inside the chamber 236 can be easily adjusted.

Inside the chamber 236, inlets of the air bleed passages 216 which are formed individually open into each of the six individual leg members 210. Therefore, next, the curtain air inside the chamber 236 flows individually through the six air bleed passages 216, and in accordance therewith, travels toward the second sub-housing 20. As noted previously, at this point in time, the pressure of the curtain air is substantially constant.

As shown in FIG. 10, the outlets of all of the six individual air bleed passages 216 overlap with the collection flow passage 162. Accordingly, the curtain air that has flowed through the six individual air bleed passages 216 flows in and is collected in the collection flow passage 162, and in addition, spreads out in an annular shape along the collection flow passage 162. In this process, the pressure of the curtain air is made more uniform.

Furthermore, the curtain air flows individually from the collection flow passage 162 into the three individual upstream communication holes 164, and individually flows along the three individual air relay passages 166. Thereafter, a portion of the curtain air is discharged from the first downstream communication holes 1681 to 1683. Further, a remaining portion of the curtain air is discharged from the second downstream communication holes 1701 to 1703. Hereinafter, the curtain air that is discharged from the first downstream communication holes 1681 to 1683 will be referred to as a "first branched air flow". The curtain air that is discharged from the second downstream communication holes 1701 to 1703 will be referred to as a "second branched air flow".

A description will now be given concerning a route of the first branched air flow. The first downstream communication hole 1681 communicates with the hollow interior of the first hollow tube portion 1601. The first downstream communication hole 1682 communicates with the hollow interior of the second hollow tube portion 1602. The first downstream communication hole 1683 communicates with the hollow interior of the third hollow tube portion 1603. Accordingly, the first branched air flow flows through the first hollow tube portion 1601 to the third hollow tube portion 1603 shown in FIG. 1, etc., and flows from the second end to the first end of the rotating electric machine housing 14.

The first hollow tube portion 1601 to the third hollow tube portion 1603 are positioned on an outer circumferential portion of the cooling jacket 24. The cooling medium is allowed to flow in advance through the cooling jacket 24. Accordingly, the heat of a first branched air flow is sufficiently conducted to the cooling medium as the first branched air flow flows along the first hollow tube portion 1601 to the third hollow tube portion 1603. Consequently, the first branched air flow becomes a relatively low temperature. More specifically, according to the present embodiment, in accordance with the cooling jacket 24 that serves in order to cool the rotating electric machine 12, the electrical current converter 150, and the like, the temperature of the first branched air flow can also be lowered.

For the reasons mentioned above, in the gas turbine engine 200 or the rotating electric machine system 10, there is no need to separately provide cooling equipment in order to cool the curtain air. Accordingly, it is possible to reduce the size and scale of the combined power system 500.

The first branched air flow that has flowed through the first hollow tube portion 1601, as shown in FIG. 2, flows into the second internal space of the second casing 28. Consequently, the air curtain is formed inside the second casing 28. A surplus amount of the first branched air flow flows through the mutual connecting holes into the first internal space 29 of the first casing 26.

The first branched air flow that has flowed through each of the second hollow tube portion 1602 and the third hollow tube portion 1603 flows into the first internal space 29 of the first casing 26. Accordingly, in the first internal space 29, an air curtain is formed by the first branched air flow that has flowed through the first hollow tube portion 1601 to the third hollow tube portion 1603.

A surplus amount of the first branched air flow, as shown in FIG. 3, flows from the first internal space 29 into the accommodation chamber 22 of the main housing 16. As can be understood from this feature, the first internal space 29 and the second internal space are positioned upstream in the direction through which the first branched air flow flows. Stated otherwise, the accommodation chamber 22 and the rotating electric machine 12 are downstream of the first casing 26 and the second casing 28 in the direction through which the first branched air flow.

The first casing 26 and the second casing 28 are disposed at the first end (the left end) of the main housing 16. Therefore, the first branched air flow flows in from the left end of the accommodation chamber 22. Thereafter, the first branched air flow enters into a clearance between the outer circumferential wall of the cylindrical columnar shaped projecting member 76 and the insulating substrates 112. Such a clearance serves as the inner hole of the stator 36.

Thereafter, a portion of the first branched air flow flows toward the first insertion hole 78 via the first air branching passage L. A remaining portion of the first branched air flow flows through the second branching passage M, passes along the clearance between the outer walls of the permanent magnets 72 and the inner walls of the electromagnetic coils 110, and flows toward the second insertion hole 86. In this manner, the first branched air flow is divided into compressed air that flows toward the first insertion hole 78 at the left end (the first end), and compressed air that flows toward the second insertion hole 86 at the right end (the second end).

The rotating electric machine 12 is cooled by the first branched air flow that flows along the clearance between the outer walls of the permanent magnets 72 and the inner walls of the electromagnetic coils 110. In this instance, as noted previously, the first branched air flow is sufficiently reduced in temperature by the cooling jacket 24. Accordingly, the rotating electric machine 12 is efficiently cooled.

Further, according to the present embodiment, the rotating electric machine 12 is cooled using the compressed air that is generated by the gas turbine engine 200. Accordingly, there is no need to supply cooling air for cooling the rotating electric machine 12 to the accommodation chamber 22. Consequently, while cooling of the rotating electric machine 12 is achieved, it is possible to simplify the configuration of the combined power system 500.

A portion of the first branched air flow that has flowed toward the first insertion hole 78 reaches the first proximal end 782 of the first insertion hole 78. In the first proximal end 782, the portion of the first branched air flow becomes an air curtain for the first bearing 74. On the other hand, the remaining portion of the first branched air flow that has flowed toward the second insertion hole 86 passes through the third sub-branching passage 941 and reaches the second distal end 861 of the second insertion hole 86. In the second distal end 861, the remaining portion of the first branched air flow becomes an air curtain for the second bearing 84.

A description will now be given concerning a route of the second branched air flow. The second downstream communication holes 1701 to 1703 individually overlap with the three individual inlets 104 that are formed in the base portion 98 of the rectifying member 96. Accordingly, the second branched air flow flows into the relay chamber 106 (the hollow interior of the rectifying member 96) through the inlets 104.

As noted previously, the outlet of the relay chamber 106 opens at a position that faces toward the small diameter cylindrical portion 242 of the compressor wheel 222. Accordingly, the second branched air flow that has flowed into the relay chamber 106 comes into contact with the small diameter cylindrical portion 242. Thereafter, a portion of the second branched air flow flows toward the fourth sub-branching passage 942. The remaining portion of the second branched air flow flows toward the outlet passage 943.

The portion of the second branched air flow reaches the second proximal end 862 of the second insertion hole 86 via the fourth sub-branching passage 942. In the second proximal end 862, the portion of the second branched air flow becomes an air curtain for the second bearing 84. In this manner, the second bearing 84 is sandwiched between the remaining portion of the second branched air flow that has reached the second proximal end 862, and the portion of the first branched air flow that has reached the second distal end 861.

The remaining portion of the second branched air flow passes through the outlet passage 943 and is discharged into the interior of the left end of the shroud case 220. At the left end opening of the shroud case 220, the air is drawn in as noted previously. Accordingly, the remaining portion of the second branched air flow is compressed by the compressor wheel 222 along with the drawn in atmospheric air.

A surplus amount of the first branched air flow passes through the accommodation chamber 22 and reaches the exhaust passage 172. A surplus amount of the second branched air flow flows from the second end to the first end of the main housing 16, for example, via the clearance between the inner wall of the accommodation chamber 22 and the electromagnetic coils 110. Thereafter, the surplus amount of the second branched air flow reaches the exhaust passage 172. The first branched air flow and the second branched air flow that have arrived at the exhaust passage 172 are recovered by the gas-liquid separation device 302 (the recovery device) via the third relay pipe 3003.

As noted previously, due to the chamber 236 provided between the inner housing 2021 and the shroud case 220, the pressure of the curtain air is equalized. Accordingly, the occurrence of a pressure distribution in the curtain air is avoided. Further, the occurrence of surging in the curtain air is also avoided. Therefore, while the pressure of the curtain air is maintained substantially constant, it is possible to supply the curtain air circumferentially around the first bearing 74 and the second bearing 84.

As noted previously, the relay chamber 106 becomes wider as it comes closer to the fourth sub-branching passage 942. In addition, the second branched air flow that has flowed out from the relay chamber 106 is divided into a portion that is directed toward the fourth sub-branching passage 942, and a remaining portion that is directed toward the outlet passage 943. Accordingly, the pressure of the second branched air flow that has reached the second proximal end 862 is less than the pressure of the second branched air flow prior to entering into the relay chamber 106. As a result, the pressure of the first branched air flow that has reached the second distal end 861, and the pressure of the second branched air flow that has reached the second proximal end 862 are in balance.

Next, a description will be given concerning the lubricating oil passage. One portion of the lubricating oil is supplied as a lubricating agent to the first bearing 74 and the second bearing 84. A remaining portion of the lubricating oil is supplied to the rotating shaft 40 as cooling oil for cooling the rotating electric machine 12.

The lubricating oil that has flowed through the first drain passage 184 and the second drain passage 196 is collected in the gas-liquid separation device 302 shown in FIG. 12. The lubricating oil and the compressed air (the curtain air) are separated in the gas-liquid separation device 302. Thereafter, the lubricating oil is pushed out by the circulation pump 308. The lubricating oil passes through the circulation supply line 304, and is supplied to the input passage 174 that is formed in the main housing 16. The lubricating oil flows from the input passage 174 into the main oil passage 176. The main oil passage 176 branches into the first oil branching passage N directed toward the first sub-housing 18, and the second oil branching passage R directed toward the second sub-housing 20. Accordingly, the lubricating oil is divided into lubricating oil that flows along the first oil branching passage N, and lubricating oil that flows along the second oil branching passage R.

One portion of the lubricating oil flows into the first auxiliary oil passage 180 via the first inflow holes 178 that are formed in the first sub-housing 18. One portion of the lubricating oil that flows through the first auxiliary oil passage 180 further flows from the first auxiliary oil passage 180 into the second auxiliary oil passage 181. Hereinafter, the lubricating oil that flows along the first auxiliary oil passage 180 and is discharged from the outlet of the first auxiliary oil passage 180 will be referred to as a "first branched oil flow". The lubricating oil that flows along the second auxiliary oil passage 181 and is discharged from the outlet of the second auxiliary oil passage 181 will be referred to as a "cooling oil". The lubricating oil that flows along the second oil branching passage R will be referred to as a "second branched oil flow".

The first branched oil flow discharged from the outlet of the first auxiliary oil passage 180 is supplied to the first distal end 781 of the first insertion hole 78 via the first oil supply hole 182 that is formed in the first bearing holder 80. At this time, the first branched oil flow is guided to the upstream guide grooves 390 of the oil guiding member 350, and to the downstream guide grooves 368 that are formed in the first outer stopper 81 toward the first bearing 74. The first branched oil flow enters into the inner hole of the first bearing 74, and thereby lubricates the first bearing 74.

The first branched oil flow that has flowed from the first distal end 781 to the first proximal end 782 is blocked by the first branched air flow (the air curtain) that has reached the first proximal end 782. Accordingly, a situation is avoided in which the first branched oil flow flows toward the first air branching passage L. Therefore, a situation is avoided in which the first branched oil flow infiltrates between the rotating shaft 40 and the electromagnetic coils 110. Consequently, it is possible to avoid a situation in which the rotating electric machine 12 becomes contaminated by the first branched oil flow.

A surplus amount of the first branched oil flow flows into the hollow concave portion 118. The first drain passage 184 communicates with the hollow concave portion 118.

Accordingly, the first branched oil flow inside the hollow concave portion 118 is collected in the gas-liquid separation device 302 via the first drain passage 184.

The second branched oil flow that has flowed through the second oil branching passage R flows into the third auxiliary oil passages 188 via the oil receiving holes 186 formed in the second sub-housing 20. The second branched oil flow that has flowed through the third auxiliary oil passages 188 is diverted into the first guide passage 1941 and the second guide passage 1942 that are formed in the interior of the oil distributor 192. A portion of the second branched oil flow that has flowed out from the outlet of the first guide passage 1941 is supplied to the second proximal end 862 of the second insertion hole 86. A remaining portion of the second branched oil flow that has passed through the second guide passage 1942 is supplied to the second bearing 84 via the second oil supply hole 195 that is formed in the second bearing holder 88. The second branched oil flow enters into the inner hole of the second bearing 84, and thereby lubricates the second bearing 84.

The second branched oil flow that has entered into the inner hole of the second bearing 84 is surrounded by the first branched air flow supplied to the second distal end 861, and the second branched air flow supplied to the second proximal end 862. In the manner described above, the pressure of the first branched air flow supplied to the second distal end 861, and the pressure of the second branched air flow supplied to the second proximal end 862 are in balance. Accordingly, a situation is avoided in which the second branched oil flow flows toward the third sub-branching passage 941 or the fourth sub-branching passage 942. Therefore, a situation is avoided in which the second branched oil flow infiltrates between the rotating shaft 40 and the electromagnetic coils 110. Further, a situation is avoided in which the second branched oil flow infiltrates into the relay chamber 106 of the rectifying member 96. Consequently, it is possible to avoid a situation in which the rotating electric machine 12 and the rectifying member 96 become contaminated by the second branched oil flow.

As noted previously, the pressure of the curtain air is adjusted to be substantially constant. Accordingly, an air curtain of a predetermined pressure is continuously formed circumferentially around the first bearing 74 and the second bearing 84. Therefore, leakage of the lubricating oil from the first bearing 74 and the second bearing 84 is prevented.

The surplus amount of the second branched oil flow flows into the space formed by the rectifying member 96 and the second outer stopper 92. The second drain hole 197 and the second drain passage 196 are formed in the second sub-housing 20. The second branched oil flow, which has flowed into the space, is collected in the gas-liquid separation device 302 via the second drain hole 197 and the second drain passage 196.

As noted previously, the first branched oil flow lubricates the first bearing 74, and the second branched oil flow lubricates the second bearing 84. Consequently, generation of seizure in the first bearing 74 and the second bearing 84 is suppressed.

A description will be given concerning the passage of the cooling oil that has flowed through the second auxiliary oil passage 181. As noted previously, the outlet of the second auxiliary oil passage 181 faces toward the annular gap 385 formed between the annular projecting member 380 of the oil guiding member 350, and the outer surface of the first shaft portion 44a in the outer shaft 44 (refer to FIG. 7 and FIG. 8). Accordingly, as shown in FIG. 7 and FIG. 8, the cooling oil is discharged toward the annular gap 385 from the outlet of the second auxiliary oil passage 181.

The inclined surface 342 of the oil receiving concave portion 340 is inclined in a manner so as to substantially coincide with the direction of travel of the cooling oil discharged from the outlet of the second auxiliary oil passage 181. Accordingly, the cooling oil, which has been discharged from the outlet of the second auxiliary oil passage 181, efficiently contacts the inclined surface 342, and moves toward the bottom surface 346 of the oil receiving concave portion 340.

At this point in time, the rotating shaft 40 begins to rotate. Accordingly, due to the action of a centrifugal force, the lubricating oil that has entered into the oil receiving concave portion 340 moves to the annular groove 384 that is positioned on the outer circumference of the oil receiving concave portion 340. Since the oil receiving concave portion 340 and the annular groove 384 possess sufficient capacity, it is possible to temporarily store a predetermined amount of the cooling oil in the oil receiving concave portion 340 and the annular groove 384.

The annular groove 384 communicates with the annular space 388 shown in FIG. 8 via the first oil delivery passages 386 that are formed in the annular convex portion 382 of the oil guiding member 350. The annular space 388 is in communication with the rotor internal oil passage 354. Accordingly, the cooling oil flows via the annular space 388 into the rotor internal oil passage 354. Furthermore, the cooling oil flows through the rotor internal oil passage 354 and toward the first drain hole 198.

In such a flow through process, the cooling oil passes over the first stepped portion 330, the second stepped portion 332, the third stepped portion 334, and the fourth stepped portion 336 (refer to FIG. 6). Therefore, as the cooling oil moves from the upstream side to the downstream side in the direction through which the cooling oil flows, the cooling oil smoothly moves outward in the radial direction of the rotating shaft 40. In this manner, as the cooling oil passes over the first stepped portion 330, the second stepped portion 332, the third stepped portion 334, and the fourth stepped portion 336, the cooling oil flows in a direction other than the axial direction of the rotating shaft 40. More specifically, the first stepped portion 330, the second stepped portion 332, the third stepped portion 334, and the fourth stepped portion 336 serve as a direction changeover portion that changes the direction through which the cooling oil flows, such that the cooling oil flows outward in the radial direction of the rotating shaft 40. The direction changeover portions include the first stepped portion 330, the second stepped portion 332, the third stepped portion 334, and the fourth stepped portion 336, as a plurality of stepped portions that are arranged with intervals in the axial direction of the rotating shaft 40 being placed therebetween. At least one of the plurality of stepped portions (in the present embodiment, the third stepped portion 334) is arranged on an inner side of the permanent magnets 72 that are arranged in an annular shape. At least one of the plurality of stepped portions (in the present embodiment, the first stepped portion 330, the second stepped portion 332, and the fourth stepped portion 336) is disposed at a position that is exposed from the permanent magnets 72 in the axial direction of the rotating shaft 40.

Since the rotating shaft 40 is rotated, a centrifugal force acts on the cooling oil that flows through the rotor internal oil passage 354. Due to the centrifugal force, there is a tendency for the cooling oil to approach the outer side in the radial direction of the rotating shaft 40. In this instance, as noted previously, on the outer shaft 44 that makes up the rotating shaft 40, the direction changeover portions are provided based on the first stepped portion 330, the second stepped portion 332, the third stepped portion 334, and the fourth stepped portion 336. Due to the direction changeover portions, the cooling oil moves outward in the radial direction of the rotating shaft 40.

A force that is directed outward in the radial direction of the rotating shaft 40, and a force that is directed in the axial direction of the rotating shaft 40 act on the cooling oil that flows in the direction changeover portions. Accordingly, it is easy for the cooling oil to flow in the direction in which the resultant force of these two forces is directed. Consequently, the cooling oil is prevented from being unevenly distributed, for example, on the inner circumferential wall of the inner hole 73 of the tubular member 70. Therefore, it is possible to avoid a situation in which flowing through of the cooling oil is impeded due to such an uneven distribution.

Stated otherwise, based on the direction changeover portions being formed in the outer shaft 44 of the rotating shaft 40, the cooling oil flows smoothly in the axial direction of the rotating shaft 40 while being directed outward in the radial direction of the rotating shaft 40. More specifically, irrespective of the centrifugal force that acts on the cooling oil, the cooling oil can be made to flow in the axial direction of the rotating shaft 40.

The cooling oil, while flowing through the rotor internal oil passage 354, comes into contact with the outer surface of the outer shaft 44. As a result thereof, the outer shaft 44 is cooled. At the same time, the cooling oil comes into contact with the inner circumferential wall of the inner hole 73 of the tubular member 70. Along therewith, the tubular member 70 and the permanent magnets 72 are cooled. In accordance with the foregoing, an excessive rise in the temperature of the rotor 34 is suppressed.

More specifically, a rise in the temperature of the permanent magnets 72 is suppressed based on them being cooled by the first branched air flow and the cooling oil. Therefore, a situation is avoided in which the temperature of the permanent magnets 72 reaches the Curie temperature. Therefore, a reduction in the magnetic force of the permanent magnets 72 can be suppressed. As a result, a predetermined magnetic force is generated in the alternating magnetic field that is formed between the permanent magnets 72 and the electromagnetic coils 110. Consequently, the rotating electric machine 12 is capable of maintaining a predetermined output. Further, by the rotor 34 being made to rotate at a high speed, it is possible to increase the output.

The cooling oil that has flowed out from the outlet (the flow through space 362) of the rotor internal oil passage 354 comes into contact with the disk portion 392. As shown in FIG. 11, the cooling oil passes through the first drain hole 198 that is formed in the second sub-housing 20, and flows into the second drain passage 196. In the second drain passage 196, the cooling oil merges with the second branched oil flow, and thereafter, is collected in the gas-liquid separation device 302.

As can be understood from this feature, by the disk portion 392, movement of the cooling oil toward the second bearing 84 is suppressed. Accordingly, even in the case that dust or debris or the like becomes mixed within the cooling oil, a situation is avoided in which such dust or debris or the like reaches the second bearing 84. Further, contact of the cooling oil, the temperature of which has resin by flowing through the rotor internal oil passage 354, with the second bearing 84 is also suppressed. Accordingly, a situation is avoided in which the temperature of the second bearing 84 rises excessively.

In the manner described above, the first branched air flow and the second branched air flow (the curtain air), the first branched oil flow, the second branched oil flow, and the cooling oil (the lubricating oil) are recovered by the gas-liquid separation device 302. In this instance, inside the rotating electric machine housing 14, the lubricating oil is blocked by the air curtain. Therefore, the lubricating oil is contained in the curtain air that is exhausted from the exhaust passage 172. More specifically, the curtain air exhausted from the exhaust passage 172 is substantially a gas-liquid mixture.

According to the present embodiment, the gas-liquid separation device 302 is included in the oil circulation supply device. Accordingly, the gas-liquid mixture is separated into the air and the lubricating oil. The air passes through the discharge line 306 that is provided in the gas-liquid separation device 302, and is released to the atmosphere. On the other hand, the lubricating oil is pushed out from the gas-liquid separation device 302 by the circulation pump 308. The lubricating oil, furthermore, passes through the circulation supply line 304 from the gas-liquid separation device 302, and is resupplied to the first bearing 74 and the second bearing 84. While the rotating shaft 40 rotates, the first bearing 74, the second bearing 84, and the rotor 34 are cooled by the lubricating oil.

In the foregoing manner, by separating the gas-liquid mixture into the lubricating oil and the air in the gas-liquid separation device 302, the occurrence of so-called air entrainment in the circulation supply line 304 and the circulation pump 308 is avoided. Accordingly, the lubricating oil is capable of being resupplied at an appropriate discharge pressure or flow rate to the first bearing 74 and the second bearing 84. Therefore, the first bearing 74 and the second bearing 84 are sufficiently lubricated. As a result, generation of seizure in the first bearing 74 and the second bearing 84 can be suppressed.

In addition, the air curtains are formed in the second air branching passage M, the third sub-branching passage 941, and the fourth sub-branching passage 942. Due to these air curtains, the lubricating oil is obstructed from entering into the first internal space 29 and the second internal space. Accordingly, the lubricating oil is prevented from adhering to the U-phase terminal 1441, the V-phase terminal 1442, the W-phase terminal 1443, the thermistor 148, and the like. Stated otherwise, it is possible to avoid a situation in which the electric terminal portions, the measuring device (the thermistor 148) and the like become contaminated by the lubricating oil.

In the foregoing manner, the curtain air (the first branched air flow and the second branched air flow) prevents the lubricating oil from scattering from the first bearing 74 and the second bearing 84. Thereafter, the curtain air is discharged to the exterior of the rotating electric machine housing 14 in the manner described above. Therefore, even in the case that the lubricating oil leaks out from the first bearing 74 or the second bearing 84, the leaked lubricating oil is accompanied by the curtain air and is discharged to the exterior of the rotating electric machine housing 14. Therefore, it is possible to avoid a situation in which the leaked lubricating oil flows toward the rotor 34. Further, it is possible to avoid a situation in which the leaked lubricating oil remains inside the rotor 34.

As has been described above, the pressure of the curtain air that is continuously supplied to the rotating electric machine housing 14 is substantially constant. Therefore, it is possible to continuously prevent the aforementioned scattering of the lubricating oil from occurring. Further, even in the case that leakage of the lubricating oil has occurred, the leaked lubricating oil can be continuously discharged to the exterior of the rotating electric machine housing 14.

The compressed air that has passed between the shroud case 220 and the compressor wheel 222 without entering into the air bleed port 234 becomes the combustion air. As shown in FIG. 13, the combustion air enters into the diffuser 226. The combustion air flows out from an outlet hole that is formed in a wall portion of the diffuser 226, and into the combustion air flow passage 274 formed between the combustor 228 and the outer housing 2022. Furthermore, the combustion air flows into the combustion chamber (the hollow interior of the combustor 228) through the relay holes 276 and the fine holes that are formed in the combustor 228, and a clearance formed between the combustor 228 and the fuel supply nozzle 275.

The combustor 228 is placed in a state of being heated beforehand. Accordingly, the combustion chamber is also at a high temperature. Fuel is supplied from the fuel supply nozzle 275 to the high temperature combustion chamber. The fuel undergoes combustion together with the combustion air, and results in a high temperature combusted fuel. At a time when the combusted fuel is supplied into the nozzle 230 from the delivery hole, the combusted fuel expands inside the nozzle 230. Consequently, the turbine wheel 224 begins to rotate at a high speed.

The output shaft 204 retains the turbine wheel 224. Further, the compressor wheel 222 is also provided on the output shaft 204. Accordingly, accompanying the turbine wheel 224 being rotated at a high speed, the output shaft 204 and the compressor wheel 222 rotate together at a high speed. Simultaneously, the rotating shaft 40 also rotates at a high speed. Moreover, the combusted fuel is discharged to the exterior of the outer housing 2022 through a non-illustrated exhaust pipe provided in the exhaust port 280.

The ring member 256, which is interposed between the compressor wheel 222 and the turbine wheel 224, also serves as a sealing member for sealing the space between both of the wheels 222 and 224. In addition, as shown in FIG. 14, the plurality of individual labyrinth forming convex portions 264 are formed on the outer circumferential wall of the ring member 256. The labyrinth forming convex portions 264 abut against the inner wall of the hole portion 272 formed in the intermediate plate 266. The compressed air generated by the compressor wheel 222 reaches the labyrinth forming convex portions 264 via the rear surface of the compressor wheel 222. Further, the combustion gas reaches the labyrinth forming convex portions 264 from the turbine wheel 224. As discussed above, the pressure of the compressed air is higher in comparison with the pressure of the combustion gas. Therefore, an occurrence is suppressed in which the combustion gas passes through the labyrinth forming convex portions 264 and flows into the compressor wheel 222. For the reasons mentioned above, a situation is avoided in which the combusted fuel, for example, enters into the through hole 240 from between both of the wheels 222 and 224.

As shown in FIG. 13, when the output shaft 204 begins to rotate at a high speed, the supply of electrical current from the battery 146 (refer to FIG. 9) to the electromagnetic coils 110 is halted. However, since the turbine wheel 224 is already rotating at a high speed in the manner described above, the rotating shaft 40 rotates at a high speed integrally together with the turbine wheel 224 and the output shaft 204. At this time as well, for the same reasons as mentioned above, a sufficient rotational torque is transmitted from the output shaft 204 with respect to the rotating shaft 40.

As shown in FIG. 3, the direction of rotation of the output shaft 204 and the rotating shaft 40 is preferably opposite to the direction of rotation when the small cap nut 58, the large cap nut 60, and the male threaded portion 252 are screwed together. This is because, in this case, a situation is avoided in which the small cap nut 58, the large cap nut 60, and the male threaded portion 252 become loosened during rotation of the rotating shaft 40. Moreover, it should be noted that the small cap nut 58, the large cap nut 60, or the male threaded portion 252 may also be provided with a mechanism in order to prevent loosening thereof.

Since the rotating shaft 40 retains the permanent magnets 72, the AC current is generated in the electromagnetic coils 110 that surround the permanent magnets 72. Via the U-phase terminal 1441, the V-phase terminal 1442, and the W-phase terminal 1443, the AC current is delivered to the electrical current converter 150 shown in FIG. 2 and FIG. 9. The conversion circuit 152 of the electrical current converter 150 converts such an AC current into a DC current. At a time when the control circuit 156 of the electrical current converter 150 has determined that the output of an external load (for example, a motor) which is electrically connected to the battery 146 has decreased, the DC current is supplied to the battery 146 (refer to FIG. 9) via the capacitor 154. Consequently, charging is carried out on the battery 146.

In this process, within the electrical current converter 150, in particular, the conversion circuit 152 and the capacitor 154 become heated. However, according to the present embodiment, the conversion circuit 152 and the capacitor 154 inside the equipment case 158 are in proximity to the cooling jacket 24. Therefore, the heat of the conversion circuit 152 and the capacitor 154 is rapidly conducted to the cooling medium inside the cooling jacket 24. Consequently, a situation is avoided in which the conversion circuit 152 and the capacitor 154 become excessively high in heat.

Accompanying the electrical current flowing therethrough, the electromagnetic coils 110 generate heat. In this instance, a portion of the first branched air flow comes into contact with the left end of the stator 36. Further, a remaining portion of the first branched air flow that flows past the accommodation chamber 22 and toward the second insertion hole 86 comes into contact with the outer wall and the inner wall of the stator 36. Therefore, the stator 36 is cooled by the first branched air flow. Further, the cooling medium flows through the cooling jacket 24 that is provided in the main housing 16. The rotating electric machine 12 is rapidly cooled by the cooling medium. Due to this feature as well, the alternating magnetic field that is formed between the permanent magnets 72 and the electromagnetic coils 110 can be made to develop a predetermined magnetic force.

According to the present embodiment, the rotating electric machine housing 14 (the main housing 16) in which the rotating electric machine 12 is accommodated, and the first casing 26 in which the U-phase terminal 1441, the V-phase terminal 1442, and the W-phase terminal 1443 are accommodated are separately provided. Therefore, the influence of heat generated in the stator 36 inside the main housing 16 is less likely to affect the U-phase terminal 1441, the V-phase terminal 1442, and the W-phase terminal 1443 inside the first casing 26. Moreover, along with the electrical current being supplied thereto, the U-phase terminal 1441, the V-phase terminal 1442, and the W-phase terminal 1443 also generate heat. However, the U-phase terminal 1441, the V-phase terminal 1442, and the W-phase terminal 1443 are rapidly cooled by the first branched air flow that is supplied to the first casing 26.

In this manner, the first branched air flow also serves to cool the heat generating locations in the rotating electric machine system 10. From the fact that the electric terminal portions (the U-phase terminal 1441, the V-phase terminal 1442, and the W-phase terminal 1443), the electromagnetic coils 110, the permanent magnets 72, and the like are cooled, a situation may be avoided in which the output control and the like of the rotating electric machine system 10 are affected by heat. Further, it is possible to prevent the magnetization of the electromagnetic coils 110, the permanent magnets 72, and the like from deteriorating due to heat. As a result, the reliability of the rotating electric machine system 10 is improved.

Furthermore, from the fact that the main housing 16 in which the rotating electric machine 12 is accommodated, and the first casing 26 in which the U-phase terminal 1441, the V-phase terminal 1442, and the W-phase terminal 1443 are accommodated are individually provided, the rotating electric machine 12 and the electric terminal portions are separated away from each other. Therefore, the U-phase terminal 1441, the V-phase terminal 1442, and the W-phase terminal 1443 are less likely to be affected by the influence of vibrations generated accompanying the rotation of the rotor 34. Stated otherwise, the U-phase terminal 1441, the V-phase terminal 1442, and the W-phase terminal 1443 are protected from vibrations. Further, as noted previously, in the first bearing 74 and the second bearing 84, generation of seizure therein is suppressed by the lubricating oil. Accordingly, the rotating electric machine system 10 is superior in terms of durability.

The angle of rotation (the rotational parameter) of the rotating shaft 40 is detected by the resolver 132 while the rotating shaft 40 is undergoing rotation. Specifically, the resolver rotor 56 that is externally fitted onto the left end part 422 of the inner shaft 42 rotates together integrally with the rotating shaft 40. Consequently, electrical signals generated in the resolver stator 130 are transmitted to the receiver via the transmission connector 136. The receiver, which has received and read the electrical signals, calculates the angle of rotation of the rotating shaft 40 on the basis of the electrical signals. The receiver delivers the calculation result to a non-illustrated control device or the like. The control device or the like obtains the rotational speed by way of a calculation based on the angle of rotation.

In the rotating shaft 40, the resolver 132 is disposed on the projecting distal end 46 that is exposed from the rotating electric machine housing 14. Accordingly, it is less likely for the resolver 132 to be influenced by heat generated in the electromagnetic coils 110 of the stator 36 inside the rotating electric machine housing 14. Further, the resolver 132 is also less likely to be affected by vibrations generated accompanying the rotation of the rotor 34. In addition, the first bearing 74 and the second bearing 84 that support the rotating shaft 40 are provided inside the rotating electric machine housing 14. Accordingly, due to the rotating electric machine housing 14, vibrations of the first bearing 74 and the second bearing 84 are suppressed. This feature as well makes it unlikely for the influence of such vibrations to reach the resolver 132.

In the foregoing manner, according to the present embodiment, transmission of heat and vibrations and the like to the resolver 132 are suppressed. Consequently, the detection result of the angle of rotation determined by the resolver 132 becomes accurate. Further, the useful lifetime of the resolver 132 is lengthened.

Cases may occur in which the resolver 132 is replaced by another resolver having a larger inner diameter and outer diameter. In the case that one solid rotating shaft is used as the rotating shaft, it is necessary to replace the rotating shaft with a large diameter solid rotating shaft, at a time when the resolver is replaced with a resolver having a large inner diameter and outer diameter. At this time, it is not easy for such a large diameter solid rotating shaft to be passed through the first bearing 74 and the second bearing 84.

According to the present embodiment, the outer shaft 44 and the inner shaft 42 constitute the rotating shaft 40. Further, the outer shaft 44 passes through the first bearing 74 and the second bearing 84, and in addition, in the inner shaft 42, the resolver rotor 56 is disposed on the portion thereof that is exposed from the outer shaft 44. Therefore, at the time when the resolver 132 is replaced with another resolver having a larger inner diameter and outer diameter, the inner shaft 42 can be replaced with an inner shaft the left end part 422 of which is formed with a larger diameter. As can be understood from this feature, according to the present embodiment, by replacing the inner shaft 42, it is possible to support resolvers having various inner diameters and outer diameters.

According to the present embodiment, the third sub-branching passage 941 and the fourth sub-branching passage 942 are provided. Alternatively, the first air branching passage L may branch off into a first sub-branching passage and a second sub-branching passage. In this case, the one portion of the first branched air flow is supplied from the first sub-branching passage to the first distal end 781, and the remaining portion of the first branched air flow is supplied from the second sub-branching passage to the first proximal end 782. Alternatively, the first air branching passage L may be branched off into the first sub-branching passage and the second sub-branching passage, and in addition, the third sub-branching passage 941 and the fourth sub-branching passage 942 may be provided.

In the gas turbine engine 200, the compressor wheel 222 and the turbine wheel 224 can also be arranged in a reverse order to that shown in FIG. 13. In this case, the through hole 240 is formed in the turbine wheel 224, and the output shaft 204 is provided in the compressor wheel 222. Apart therefrom, the compressor wheel 222 and the turbine wheel 224 may be of a centrifugal type or an axial flow type. If the compressor wheel 222 and the turbine wheel 224 are arranged on the same axis, a combination of a multi-stage compressor wheel and a multi-stage turbine wheel, which is a combination of a centrifugal type and an axial flow type, may be used.

In FIG. 3, the rotating electric machine 12 that makes up the rotating electric machine system 10 may be a motor that rotates the rotating shaft 40 by supplying an electrical current to the electromagnetic coils 110. In this case, the U-phase terminal 1441, the V-phase terminal 1442, and the W-phase terminal 1443 serve as electric terminal portions that receive the electrical power from the battery 146.

Figure 15:
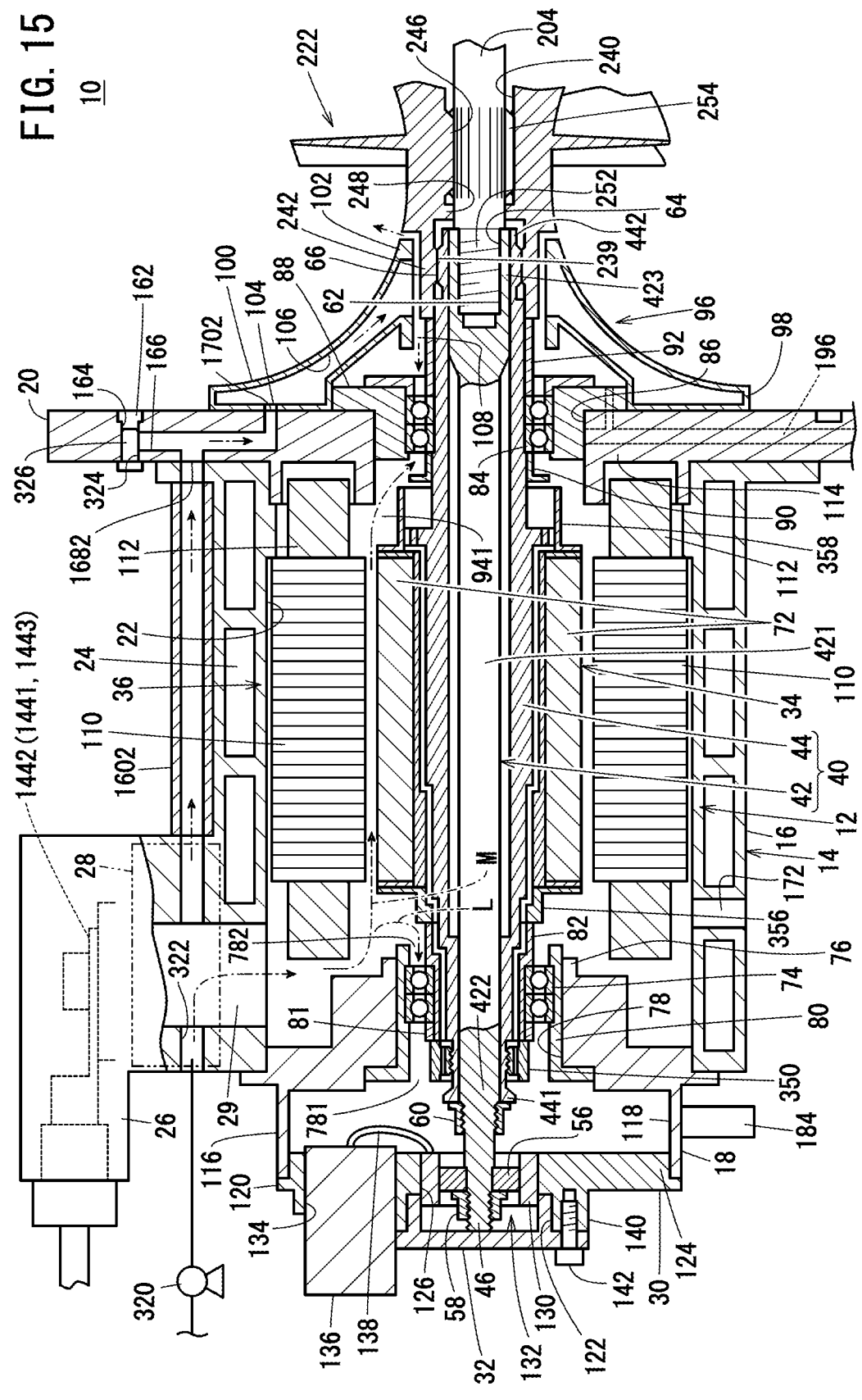
FIG. 15 is a schematic side cross-sectional view of a case of using an externally provided compression pump as a gas supplying device.

It is also possible to disconnect the rotating electric machine system 10 from the gas turbine engine 200, and for it to be used independently. In a case in which it is necessary to supply the compressed air to the rotating electric machine system 10, as shown in FIG. 15, a compression pump 320 may be provided externally of the rotating electric machine housing 14, and the compression pump 320 may be used as an air supplying device.

In this case, for example, a communication hole 322 is formed in the first casing 26. Compressed air supplied from the compression pump 320 flows into this communication hole 322. Also, a communication hole 324, which is continuous with the upstream communication holes 164, is formed in the second sub-housing 20. The communication hole 324 is closed with a plug 326. In this state, the compression pump 320 compresses the air or the like, whereby the compressed air is obtained. The compressed air is supplied to the first hollow tube portion 1601 to the third hollow tube portion 1603.

Furthermore, in the above-described embodiment, although the cooling oil is made to flow through in a direction from the first bearing 74 toward the second bearing 84, conversely to this feature, the cooling oil may be made to flow through in a direction from the second bearing 84 toward the first bearing 74. In this case, the second auxiliary oil passage 181 branches off from the third auxiliary oil passages 188. Further, it is preferable for the outer diameter of the outer shaft 44 to become greater in diameter from the second bearing 84 toward the first bearing 74. The disk portion 392 is provided at the second end of the first inner stopper 82.

Instead of the disk portion 392 being provided on the first inner stopper 82 or the second inner stopper 90, a disk member that is separate from the first inner stopper 82 or the second inner stopper 90 may be installed on the outer shaft 44.

As described above, in the present embodiment, the rotating electric machine system (10) is disclosed, which is equipped with the rotating electric machine (12) provided with the rotor (34) including the permanent magnet (72) and the rotating shaft (40), and is equipped with the rotating electric machine housing (14) in which the rotating shaft is rotatably supported, the rotating electric machine system including the first bearing (74) and the second bearing (84) that are interposed between the rotating electric machine housing and the rotating shaft, and the oil circulation supply device configured to circulate and supply the lubricating oil to the first bearing and the second bearing, wherein the rotating electric machine housing includes the first oil supply passage (176) configured to supply the lubricating oil supplied from the oil circulation supply device to the first bearing and the second bearing, and the second oil supply passage (181) configured to branch off from the first oil supply passage and to supply the lubricating oil toward the rotor, and wherein the rotor internal oil passage (354), through which the lubricating oil that flows out from the second oil supply passage is made to flow, is formed in the interior of the rotor, and the rotating electric machine housing includes the oil discharge passage (184, 196) configured to discharge the lubricating oil, which has flowed through the first oil supply passage, the second oil supply passage, and the rotor internal oil passage, to the oil circulation supply device.

In this manner, according to the present embodiment, a portion of the lubricating oil supplied to the bearings is diverted and made to flow through the rotor internal oil passage. Based on the lubricating oil flowing in this manner, the rotor that constitutes the rotating electric machine is efficiently cooled by the lubricating oil.

As can be understood from this feature, according to the present embodiment, a portion of the lubricating oil is used as cooling oil for cooling the rotor. Accordingly, it is not necessary to individually provide an oil passage for supplying and recovering the lubricating oil for the bearings, and an oil passage for supplying and recovering the cooling oil for the rotor. Consequently, any concern that the configuration of the rotating electric machine system may become complex is dispensed with. Further, any concern that the size and scale of the rotating electric machine system may increase is dispensed with.

In addition, since the rotor is cooled by the lubricating oil, the temperature of the permanent magnet that makes up the rotor is prevented from reaching the Curie temperature. Therefore, a reduction in the magnetic force of the permanent magnet is suppressed. As a result, a predetermined magnetic force is generated in the alternating magnetic field that is formed between the permanent magnet and the electromagnetic coils. Therefore, the rotating electric machine maintains a predetermined output. Further, by the rotor being made to rotate at a high speed, it is possible to increase the output.

In the present embodiment, the rotating electric machine system is disclosed, in which the rotor may include the tubular member (70) interposed between the rotating shaft and the permanent magnet in the radial direction of the rotating shaft, and at least a portion of the rotor internal oil passage may be formed between the outer surface of the rotating shaft, and the inner circumferential wall of the tubular member.

In accordance with such features, one portion of the rotor internal oil passage can be formed easily.

In the present embodiment, the rotating electric machine system is disclosed, in which the rotor internal oil passage may be a space configured to extend in the axial direction of the rotating shaft.

In accordance with this feature, the rotor can be cooled over the entirety of the axial direction thereof.

In the present embodiment, the rotating electric machine system is disclosed, in which the rotor internal oil passage may extend at least from one end of the permanent magnet to another end in the axial direction of the rotating shaft.

In this case, the entirety of the permanent magnet is cooled in an efficient manner. Accordingly, it is possible to further suppress a rise in the temperature of the permanent magnet.

In the present embodiment, the rotating electric machine system is disclosed, in which the inlet of the rotor internal oil passage may be positioned outward relative to the first bearing in the axial direction of the rotating shaft, and the outlet of the rotor internal oil passage may be positioned inward relative to the second bearing in the axial direction of the rotating shaft.

In accordance with such features, the lubricating oil supplied to the first bearing is prevented from flowing through the rotor internal oil passage. Similarly, the lubricating oil that has flowed through the rotor internal oil passage is prevented from being supplied to the second bearing.

In the present embodiment, the rotating electric machine system is disclosed, in which the first oil supply passage may include the first oil branching passage (N) facing toward the first bearing, and the second oil branching passage (R) facing toward the second bearing, and the second oil supply passage may branch off from the first oil branching passage.

In accordance with such a configuration, a portion from the lubricating oil directing toward the first bearing can be diverted. More specifically, it is easy for the portion of the lubricating oil to be diverted, and be made to flow through the rotor internal oil passage as the cooling oil for cooling the rotor.

In the present embodiment, the rotating electric machine system is disclosed, which may include the first oil pathway (184) configured to guide the lubricating oil supplied to the first bearing from the first oil branching passage, to the oil circulation supply device, and the second oil pathway (196) configured to guide the lubricating oil supplied to the second bearing from the second oil branching passage, and the lubricating oil that has flowed through the rotor internal oil passage, to the oil circulation supply device.

In accordance with such a configuration, after having recovered the lubricating oil supplied to the first bearing and the second bearing, and the lubricating oil that has cooled the rotor, the lubricating oil can be easily resupplied to the first bearing and the second bearing and the rotor internal oil passage.

In the present embodiment, the rotating electric machine system is disclosed, which may further include the gas supplying device (200) configured to supply the gas to the first bearing and the second bearing, wherein the rotating electric machine housing may include the gas supplying passages (1601 to 1603) configured to supply the gas supplied from the gas supplying device to the first bearing and the second bearing, and the gas discharge passage (172) configured to discharge the gas from the first bearing and the second bearing, and the oil circulation supply device may collect the gas that has flowed through the gas discharge passage, and the lubricating oil that has flowed through the oil discharge passage, and resupply the lubricating oil to the first oil supply passage.

The gas supplied to the first bearing and the second bearing forms a gas curtain. Such a gas curtain seals the lubricating oil that was supplied to the first bearing and the second bearing. More specifically, the lubricating oil supplied to the first bearing and the second bearing is blocked by the gas curtain. Accordingly, the lubricating oil is prevented from scattering circumferentially around the first bearing or the second bearing. Consequently, for example, a situation is avoided in which the rotating shaft or the like becomes contaminated by the lubricating oil.

Further, since the oil circulation supply device recovers the gas and the lubricating oil together, there is no need for the gas and the lubricating oil to be recovered separately. Accordingly, it is also unnecessary to provide a gas recovery device in the rotating electric machine system. Therefore, a situation is avoided in which the configuration of the rotating electric machine system becomes complex.

In the present embodiment, the rotating electric machine system is disclosed, in which the oil circulation supply device may include the gas-liquid separation device (302) configured to separate the gas and the lubricating oil.

Since the gas-liquid separation device separates the gas and the lubricating oil, even though the gas and the lubricating oil are collected together, only the lubricating oil is capable of being resupplied to the first oil supply passage. More specifically, in this case, it is easy to circulate and supply the lubricating oil to the first bearing, the second bearing, and the second oil supply passage.

In the present embodiment, the combined power system (500) is disclosed, including the aforementioned rotating electric machine system (10), and the internal combustion engine (200) including the output shaft (204) configured to rotate integrally with the rotating shaft.

In accordance with such features, the combined power system can be constituted in which the rotating electric machine system and the internal combustion engine are integrally combined. In this case, even though the rotor in the rotating electric machine system is cooled in the manner described above, it is possible to avoid a situation in which the rotating electric machine system becomes complex or large in scale. Therefore, it is possible to avoid a situation in which the combined power system becomes complicated or large in scale. Further, it is possible to avoid a situation in which the weight of the combined power system becomes large.

Moreover, it should be noted that the present invention is not limited to the disclosure described above, but various configurations may be adopted therein without departing from the essence and gist of the present invention.

The invention claimed is:

1. A rotating electric machine system that is equipped with a rotating electric machine provided with a rotor including a permanent magnet and a rotating shaft, and is equipped with a rotating electric machine housing in which the rotating shaft is rotatably supported, the rotating electric machine system comprising:

a first bearing and a second bearing that are interposed between the rotating electric machine housing and the rotating shaft; and an oil circulation supply device configured to circulate and supply lubricating oil to the first bearing and the second bearing, wherein the rotating electric machine housing includes:

a first oil supply passage configured to supply the lubricating oil supplied from the oil circulation supply device to the first bearing and the second bearing; and a second oil supply passage configured to branch off from the first oil supply passage and to supply the lubricating oil toward the rotor, and wherein a rotor internal oil passage, through which the lubricating oil that flows out from the second oil supply passage is made to flow, is formed in an interior of the rotor, the rotating electric machine housing includes an oil discharge passage configured to discharge the lubricating oil, which has flowed through the first oil supply passage, the second oil supply passage, and the rotor internal oil passage, to the oil circulation supply device, the rotating electric machine system includes an oil guiding member that is provided on an outer surface of the rotating shaft, is configured to receive the lubricating oil from the second oil supply passage, and is configured to guide the lubricating oil to the rotor internal oil passage, and an inlet of the rotor internal oil passage is formed between the outer surface of the rotating shaft and the oil guiding member.

2. The rotating electric machine system according to claim 1, wherein the rotor includes a tubular member interposed between the rotating shaft and the permanent magnet in a radial direction of the rotating shaft, and at least a portion of the rotor internal oil passage is formed between an outer surface of the rotating shaft, and an inner circumferential wall of the tubular member.

3. The rotating electric machine system according to claim 1, wherein the rotor internal oil passage is a space configured to extend in an axial direction of the rotating shaft.

4. The rotating electric machine system according to claim 3, wherein the rotor internal oil passage extends at least from one end of the permanent magnet to another end in the axial direction of the rotating shaft.

5. The rotating electric machine system according to claim 3, wherein an inlet of the rotor internal oil passage is positioned outward relative to the first bearing in the axial direction of the rotating shaft, and an outlet of the rotor internal oil passage is positioned inward relative to the second bearing in the axial direction of the rotating shaft.

6. The rotating electric machine system according to claim 1, wherein the first oil supply passage includes a first oil branching passage facing toward the first bearing, and a second oil branching passage facing toward the second bearing, and the second oil supply passage branches off from the first oil branching passage.

7. The rotating electric machine system according to claim 6, wherein the oil discharge passage comprises:

a first oil pathway configured to guide the lubricating oil supplied to the first bearing from the first oil branching passage, to the oil circulation supply device; and a second oil pathway configured to guide the lubricating oil supplied to the second bearing from the second oil branching passage, and the lubricating oil that has flowed through the rotor internal oil passage, to the oil circulation supply device.

8. The rotating electric machine system according to claim 1, further comprising a gas supplying device configured to supply a gas to the first bearing and the second bearing, wherein the rotating electric machine housing further includes gas supplying passages configured to supply the gas supplied from the gas supplying device to the first bearing and the second bearing, and a gas discharge passage configured to discharge the gas from the first bearing and the second bearing; and the oil circulation supply device collects the gas that has flowed through the gas discharge passage, and the lubricating oil that has flowed through the oil discharge passage, and resupplies the lubricating oil to the first oil supply passage.

9. The rotating electric machine system according to claim 8, wherein the oil circulation supply device includes a gas-liquid separation device configured to separate the gas and the lubricating oil.

10. The rotating electric machine system according to claim 1, wherein the second oil supply passage includes a nozzle configured to discharge the lubricating oil toward the oil guiding member, the rotating shaft includes an inclined surface that is inclined radially inward from the first bearing toward the second bearing, and the nozzle faces the inclined surface.

11. The rotating electric machine system according to claim 10, wherein the outer surface of the rotating shaft is provided with an oil receiving concave portion that is an annular shaped concave portion, and the oil receiving concave portion is positioned between the inclined surface and the rotor internal oil passage in a direction in which the lubricating oil flows.

12. A combined power system comprising a rotating electric machine system and an internal combustion engine, wherein the rotating electric machine system comprises:

a rotating electric machine provided with a rotor including a permanent magnet and a rotating shaft;

a rotating electric machine housing in which the rotating shaft is rotatably supported;

a first bearing and a second bearing that are interposed between the rotating electric machine housing and the rotating shaft; and an oil circulation supply device configured to circulate and supply lubricating oil to the first bearing and the second bearing, wherein the rotating electric machine housing includes:

a first oil supply passage configured to supply the lubricating oil supplied from the oil circulation supply device to the first bearing and the second bearing; and a second oil supply passage configured to branch off from the first oil supply passage and to supply the lubricating oil toward the rotor, and wherein a rotor internal oil passage, through which the lubricating oil that flows out from the second oil supply passage is made to flow, is formed in an interior of the rotor;

the rotating electric machine housing includes an oil discharge passage configured to discharge the lubricating oil, which has flowed through the first oil supply passage, the second oil supply passage, and the rotor internal oil passage, to the oil circulation supply device;

the internal combustion engine includes an output shaft configured to rotate integrally with the rotating shaft, the rotating electric machine system includes an oil guiding member that is provided on an outer surface of the rotating shaft, is configured to receive the lubricating oil from the second oil supply passage, and is configured to guide the lubricating oil to the rotor internal oil passage, and an inlet of the rotor internal oil passage is formed between the outer surface of the rotating shaft and the oil guiding member.

* * * * *